United States Patent
Wang et al.

(10) Patent No.: US 12,273,930 B2
(45) Date of Patent: Apr. 8, 2025

(54) HANDLING OF UPLINK LISTEN-BEFORE-TALK FAILURES FOR HANDOVER

(71) Applicant: Telefonaktiebolaget LM Ericsson (publ), Stockholm (SE)

(72) Inventors: Min Wang, Luleå (SE); Iana Siomina, Täby (SE); Jan Christoffersson, Luleå (SE); Muhammad Ali Kazmi, Sundbyberg (SE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 375 days.

(21) Appl. No.: 17/916,869

(22) PCT Filed: Apr. 7, 2021

(86) PCT No.: PCT/EP2021/058994
§ 371 (c)(1),
(2) Date: Oct. 4, 2022

(87) PCT Pub. No.: WO2021/204835
PCT Pub. Date: Oct. 14, 2021

(65) Prior Publication Data
US 2023/0156817 A1    May 18, 2023

Related U.S. Application Data

(60) Provisional application No. 63/007,393, filed on Apr. 9, 2020.

(51) Int. Cl.
*H04W 74/0833* (2024.01)
*H04W 16/14* (2009.01)
(Continued)

(52) U.S. Cl.
CPC ... *H04W 74/0841* (2013.01); *H04W 36/0077* (2013.01); *H04W 36/0079* (2018.08); *H04W 74/0808* (2013.01); *H04W 76/19* (2018.02)

(58) Field of Classification Search
CPC ......... H04W 74/0841; H04W 36/0077; H04W 36/0079; H04W 74/0808; H04W 76/19;
(Continued)

(56) References Cited

U.S. PATENT DOCUMENTS 10,362,615 B2 * 7/2019 Hong ..................... H04W 76/15
11,711,851 B2 * 7/2023 Chen ..................... H04W 76/27
  370/329

(Continued)

FOREIGN PATENT DOCUMENTS

WO    2020064615 A1    4/2020

OTHER PUBLICATIONS

"3GPP TS 23.501 V15.8.0", 3rd Generation Partnership Project; Technical Specification Group Services and System Aspects; System architecture for the 5G System (5GS); Stage 2 (Release 15), Dec. 2019, pp. 1-248.
(Continued)

*Primary Examiner* — Harry H Kim
(74) *Attorney, Agent, or Firm* — Murphy, Bilak & Homiller, PLLC

(57) ABSTRACT

The invention relates to a method in a user equipment, UE, for performing handover to a target cell in a wireless network, the method comprising performing (1340) a first random-access, RA, procedure in first RA resources of the target cell, in response to failure of the first RA procedure, refraining (1350) from declaring a radio link failure, RLF, for the target cell and performing a second RA procedure in second RA resources of the target cell that are different from the first RA resources; and declaring (1370) a RLF for the
(Continued)

---

Sending, to the UE, a target cell configuration that includes a plurality of random access (RA) resources, including the first and second RA resources.    1410

↓

Performing handover of the UE, to the target cell, based on successful completion by the UE of a first RA procedure in the first RA resources or of a second RA procedure in the second RA resources before expiration of the timer.    1420

↓

Refraining from handover of the UE, to the target cell, based on failure of the first RA procedure and on one of the following: failure of at least the second RA procedure, or expiration of the timer before successful completion of at least second RA procedure.    1430 target cell based on failure of the first RA procedure and a failure of the second RA procedure, or an expiration of a timer before successful completion of the second RA procedure; the invention further relates to a UE implementing the method, to a corresponding method in a network node and a network node implementing the method.

12 Claims, 11 Drawing Sheets

(51) Int. Cl.
*H04W 36/00* (2009.01)
*H04W 74/0808* (2024.01)
*H04W 74/0836* (2024.01)
*H04W 74/0838* (2024.01)
*H04W 76/19* (2018.01)

(58) Field of Classification Search
CPC ............. H04W 16/14; H04W 74/0836; H04W 74/0838; H04W 74/0833
See application file for complete search history.

(56) References Cited

U.S. PATENT DOCUMENTS

2016/0234861 A1* 8/2016 Ye ..................... H04W 74/0808
2020/0252974 A1* 8/2020 Akkarakaran ........ H04W 52/36

OTHER PUBLICATIONS

"3GPP TS 38.211 V16.0.0", 3rd Generation Partnership Project; Technical Specification Group Radio Access Network; NR; Physical channels and modulation (Release 16), Dec. 2019, pp. 1-129.

"3GPP TS 38.214 V15.0.0", 3rd Generation Partnership Project; Technical Specification Group Radio Access Network; NR; Physical layer procedures for data (Release 15), Dec. 2017, pp. 1-71.

"Discussion on handover in NR-U", 3GPP RAN WG4 Meeting #94-e; R4-2001555; Online, Feb. 24-Mar. 6, 2020, pp. 1-2.

"Discussion regarding NR-U handover", 3GPP TSG-RAN WG4 RAN4#94; R4-2002132; E-meeting, Feb. 24-Mar. 6, 2020, pp. 1-5.

"3GPP TS 38.300 V16.0.0", 3rd Generation Partnership Project; Technical Specification Group Radio Access Network; NR; NR and NG-RAN Overall Description; Stage 2 (Release 16), Dec. 2019, pp. 1-101.

"3GPP TS 38.331 V16.0.0", 3rd Generation Partnership Project; Technical Specification Group Radio Access Network; NR; Radio Resource Control (RRC) protocol specification (Release 16), Mar. 2020, pp. 1-835.

"3GPP TS 36.300 V15.7.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Sep. 2019, pp. 1-295.

"3GPP TS 38.321 V15.8.0", 3rd Generation Partnership Project; Technical Specification Group Radio Access Network; NR; Medium Access Control (MAC) protocol specification (Release 15), Dec. 2019, pp. 1-78.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

* cited by examiner

HANDLING OF UPLINK LISTEN-BEFORE-TALK FAILURES FOR HANDOVER

TECHNICAL FIELD

The present disclosure generally relates to wireless communication networks, and particularly relates to handover operation of wireless devices (e.g., user equipment or UEs) applying unlicensed spectrum.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D), and several other use cases too. The present disclosure relates generally to NR, but the following description of previous-generation technology is provided for context since it shares many features with NR.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively. Cell 116 by way of example may act as a source cell, and cell 111 may act as a target cell with respect to UE 120 performing or initiating a handover from source cell to target cell.

The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115. eNB 115 by way of example may provide source cell 116 and eNB 110 may provide target cell 111.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labelled 0 through 19, each with a fixed duration of 0.5 ms. A 1-ms subframe comprises two consecutive slots where subframe i consists of slots 2i and 2i+1. Each exemplary DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as discussed above, but comprising $N^{UL}_{symb}$ OFDM symbols, each of which includes $N_{sc}$ subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz SCS) or 24 (7.5-kHz SCS). The configuration of 15-kHz SCS and "normal" CP is often referred to as the numerology, μ.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS and SRS mentioned above. Other RS-like DL signals include Primary Synchronization Sequence (PSS) and Secondary Synchronization Sequence (SSS), which facilitate the UEs time and frequency synchronization and acquisition of system parameters (e.g., via PBCH).

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment"). In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions.

Fifth-generation NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE that has some properties similar to a "suspended" condition used in LTE.

In addition to providing coverage via cells, as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Furthermore, time-frequency resources can be configured much more flexibly for an NR cell than for an LTE cell. For example, rather than a fixed 15-kHz SCS as in LTE, NR SCS can range from 15 to 240 kHz, with even greater SCS considered for future NR releases.

NR also targets both licensed and unlicensed bands, and a work item named NR-based Access to Unlicensed Spectrum (NR-U) was started in January 2019. Allowing unlicensed networks (i.e., networks that operate in spectrum not licensed to the operator such that it must be shared) to effectively use available spectrum is an attractive approach to increase system capacity. Although unlicensed spectrum generally does not match the quality of licensed (e.g., unshared) spectrum, solutions that allow an efficient use of it as a complement to licensed deployments have the potential to bring great value to the 3GPP operators, and, ultimately, to the 3GPP industry as a whole. It is expected that some features in NR will need to be adapted to comply with the special characteristics of the unlicensed band as well as also different regulations.

Before a UE performs an UL transmission in unlicensed spectrum, it typically needs to perform a listen-before-talk (LBT) or a clear channel assessment (CCA). An NR UE may be configured with several bandwidth parts (BWPs), as described in more detail below, and UL LBT failure handling can be generally handled individually for each BWP. For example, if a UE experiences LBT problems in its current active BWP, it is beneficial for the UE to attempt random access (RA) in another configured BWP. When the UE has detected LBT failures in all configured BWPs, the UE can trigger RLF due to LBT failure. On the other hand, various other conditions (e.g., handover failure to a target cell) can cause the UE to trigger RLF much earlier. This inconsistent behavior can lead to various problems, issues, and/or difficulties for UE operation in unlicensed bands, particularly for handovers.

SUMMARY

Embodiments of the present disclosure provide specific improvements to communication between user equipment (UE) and network nodes in a wireless communication network, such as by facilitating solutions to overcome the exemplary problems summarized above and described in more detail below.

Some exemplary embodiments of the present disclosure include methods (e.g., procedures) for performing handover to a target cell in a wireless network. The exemplary method can be performed by a user equipment (UE, e.g., wireless device, IoT device, modem, etc. or component thereof) in communication with a network node (e.g., base station, eNB, gNB, ng-eNB, etc., or component thereof) in the wireless network (e.g., E-UTRAN, NG-RAN).

These exemplary methods can include performing a first random-access (RA) procedure in first RA resources of the target cell. These exemplary methods can also include, in response to failure of the first RA procedure, refraining from declaring a radio link failure (RLF) for the target cell and performing a second RA procedure in second RA resources of the target cell that are different from the first RA resources. These exemplary methods can also include declaring a RLF for the target cell based on failure of the first RA procedure and on one of the following: failure of at least the second RA procedure, or expiration of the timer before successful completion of at least second RA procedure. In some embodiments, these exemplary methods can also include performing handover to the target cell in response to successful completion of the first RA procedure or the second RA procedure before expiration of the timer.

In some embodiments, performing the first RA procedure can include perform a first plurality of listen-before-talk (LBT) procedures in the first RA resources. In such embodiments, the failure of the first RA procedure can be based on a number of failures among the first plurality of LBT procedures being equal to or greater than a (first) predetermined threshold (in other words, the failure of the first RA procedure is assumed if the number of failures exceeds the predetermined first threshold, wherein the failures may be consecutive failures or failures within a certain time frame), such failure may also being referred to as consistent failure. Similarly, in some embodiments, performing the second RA procedure can include performing a second plurality of LBT procedures in the second RA resources. In such embodiments, the failure of the second RA procedure can be based on a number of failures among the second plurality of LBT procedures being equal to or greater than (a second) predetermined threshold (in other words, the failure of the second RA procedure is assumed if the number of failures exceeds the predetermined second threshold, wherein the failures may be consecutive failures or failures within a certain time frame, and wherein the first threshold and the second threshold may be equal or different; in the following it will be assumed that they are equal).

In some embodiments, these exemplary methods can also include receiving, from the wireless network, a target cell configuration that includes a plurality of RA resources, including the first and second RA resources. Furthermore, the UE can select the first RA resources for the first RA procedure based on one or more of the following criteria:
  a predefined rule;
  a sequence indicated in the configuration for the target cell;
  types of RA procedures associated with the respective RA resources;
  characteristics of sub-bands or bandwidth parts (BWPs) in which the respective RA resources are located;
  respective availability indications, by the wireless network, for sub-bands or BWPs in which the respective RA resources are located;
  a value used to initialize the timer and one or more thresholds associated with the value;
  an amount of time remaining on the timer and one or more thresholds associated with the amount of time;
  measurements by the UE on reference signals associated with the respective RA resources; and
  interference measurements by the wireless network on the respective RA resources.

In some embodiments, the UE can be configured with a first bandwidth part (BWP) and a second BWP, with the first RA resources being in the first BWP and the second RA resources being in the second BWP. In some of these embodiments, each of the first BWP and the second BWP can include two or more of the following:
  resources for two-step contention-based RA procedures;
  resources for two-step contention-free RA procedures;
  resources for four-step contention-based RA procedures; and
  resources for four-step contention-free RA procedures.

In other embodiments, the first RA resources are first time resources associated with the first BWP and the second RA resources are second time resources associated with the first BWP.

In some embodiments, these exemplary methods can also include, in response to failure of the second RA procedure, refraining from declaring a RLF for the target cell and performing a third RA procedure in third RA resources, of the target cell, that are different from the first and second RA resources. In such embodiments, declaring the RLF for the target cell can be based on failure of the first, second, and third RA procedures. In such embodiments, the third RA resources can be in the second BWP or a third BWP that is different from the first and second BWPs.

In some embodiments, the UE can be configured with a normal uplink (UL) carrier and a supplementary UL carrier. In such embodiments, the first and second RA resources are associated with different ones of the normal and supplementary UL carriers, and the first RA resources can be selected for the first RA procedure based on UE measurements of respective reference signals associated with the normal UL carrier and the supplementary UL carrier.

In some embodiments, these exemplary methods can also include, before performing the first RA procedure, configuring the timer such that it will not expire before completion of at least the first and second RA procedures. In this manner, the timer's influence on declaring RLF can be mitigated, reduced, and/or eliminated, as discussed in more detail herein.

In some embodiments, the first and second RA procedures can be performed in unlicensed frequency spectrum. In such embodiments, the wireless network can be one of the following: an NG-RAN configured to support NR-U operation (e.g., above 52.6 GHz, as discussed above); or an E-UTRAN configured to support LTE licensed assisted access (LAA) operation (e.g., ~5 GHz).

Other exemplary embodiments include methods (e.g., procedures) for configuring handover of a UE to a target cell in the wireless network. The exemplary method can be performed by the wireless network (e.g., E-UTRAN, NG-RAN), such as by one or more network nodes (e.g., base station, eNB, gNB, ng-eNB, etc., or component thereof) in the wireless network.

These exemplary methods can include sending, to the UE, a target cell configuration that includes a plurality of random access (RA) resources, including first and second RA resources. The exemplary method can also include performing handover of the UE, to the target cell, based on successful completion by the UE of a first RA procedure in the first RA resources or of a second RA procedure in the second RA resources, before expiration of the timer. The exemplary method can also include refraining from handover of the UE, to the target cell, based on failure of the first RA procedure and on one of the following: failure of at least the second RA procedure, or expiration of the timer before successful completion of at least second RA procedure.

In various embodiments of these exemplary methods for configuring UE handover, the first/second/third RA resources, the first/second/third RA procedures, the timer, and the wireless network can have characteristics that are similar and/or complementary to the characteristics of the same features that were discussed above in relation the exemplary methods for performing handover by the UE. As such, the two types of exemplary methods can be used cooperatively.

Other exemplary embodiments include user equipment (UEs, e.g., wireless devices, IoT devices, or components thereof, such as a modem) and wireless networks (e.g., E-UTRAN, NG-RAN or nodes therein, such as base stations, eNBs, gNBs, en-gNBs, etc.) configured to perform operations corresponding to any of the exemplary methods described herein. Other exemplary embodiments include non-transitory, computer-readable media storing program instructions that, when executed by processing circuitry, configure such UEs or wireless networks to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 7, which includes

DETAILED DESCRIPTION

Figure 1:
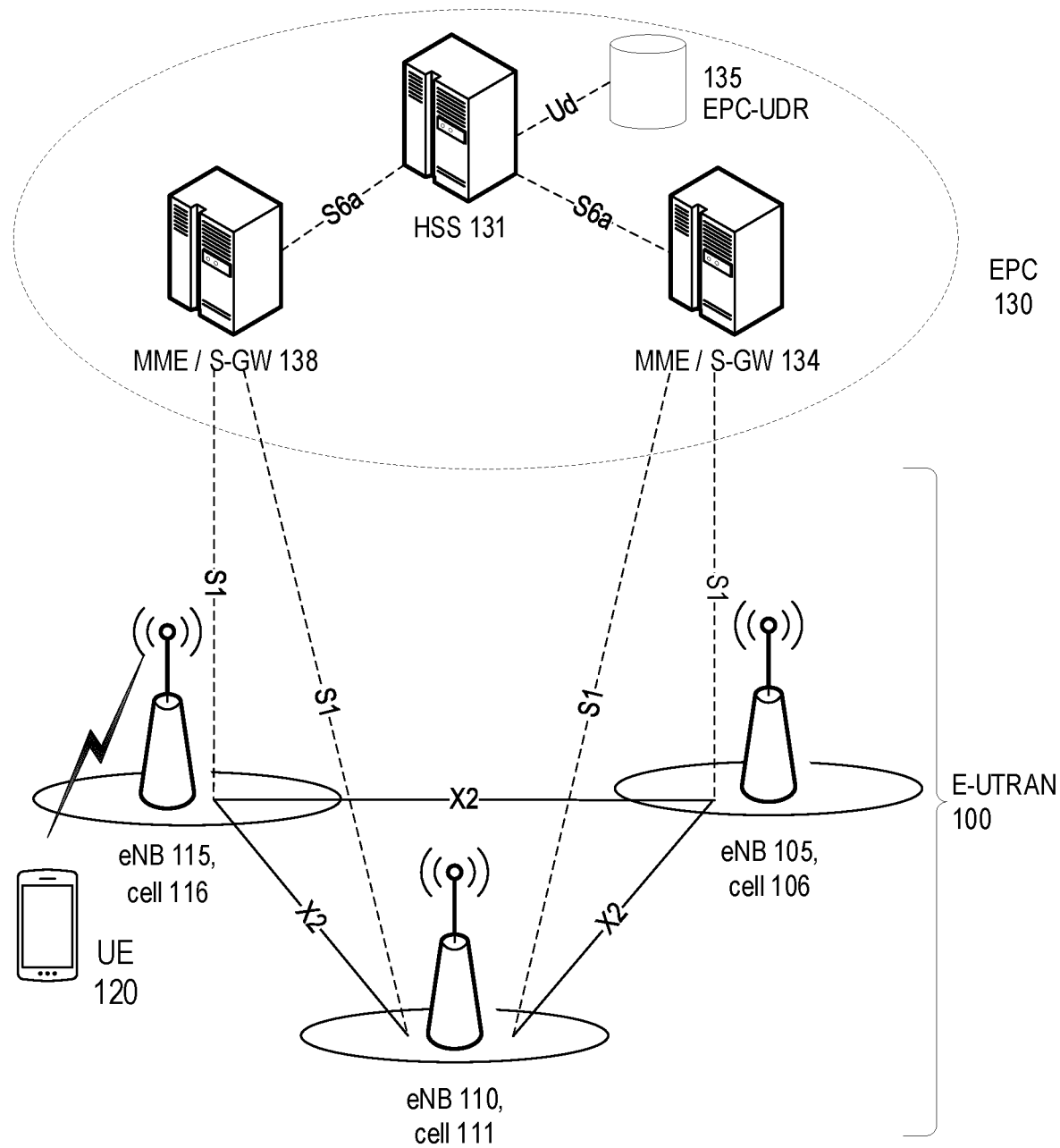
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
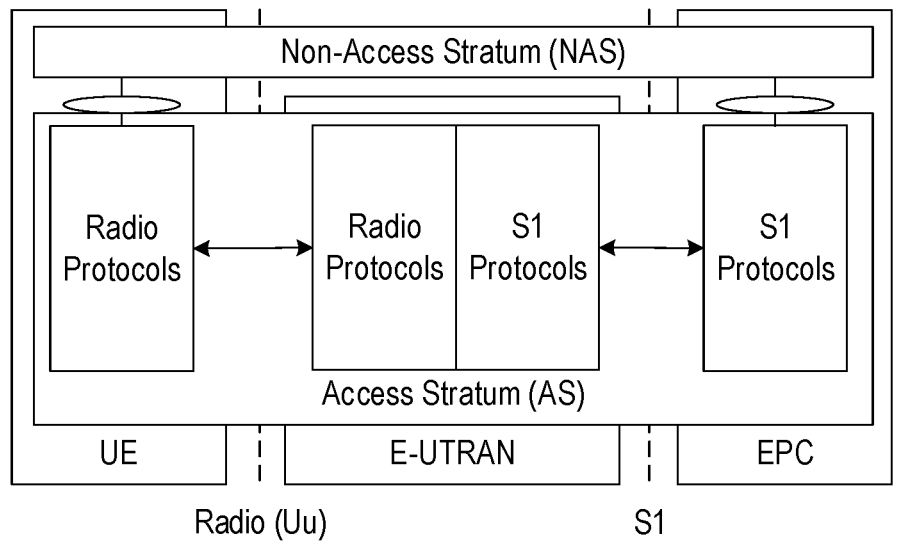
FIG. 2A is a high-level block diagram of an exemplary E-UTRAN architecture in terms of its constituent components, protocols, and interfaces.
Figure 2B:
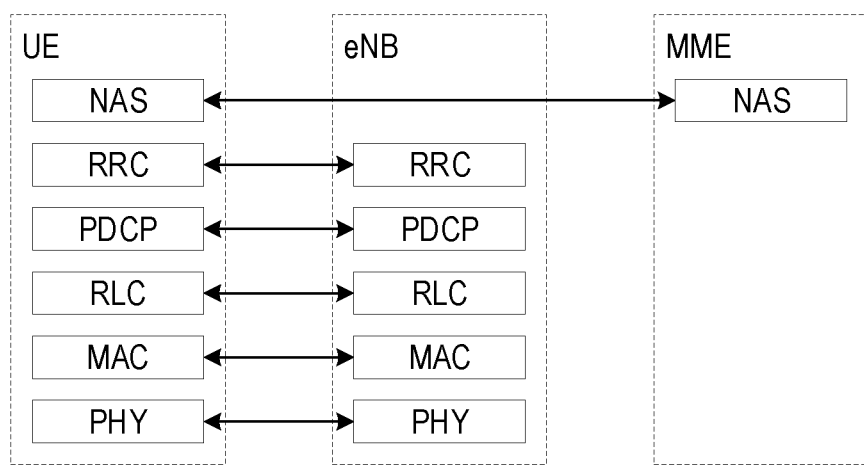
FIG. 2B is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

For a node to be allowed to transmit in unlicensed spectrum, it typically needs to perform a listen-before-talk (LBT) or a clear channel assessment (CCA). For example, in the 5 GHz band, the sensing is done over 20-MHz channels. In general, the MAC layer initiates a transmission and requests the PHY layer to initiate the LBT procedure. After completion, the PHY layer indicates the LBT outcome (e.g., success or failure). This procedure can include sensing the medium as idle for a number of time intervals, which can be done in various ways including energy detection, preamble detection, or virtual carrier sensing.

In virtual carrier sensing, the node reads control information from other transmitting nodes informing when transmissions end. After sensing the medium idle, a node is typically allowed to transmit for a certain amount of time, referred to as transmission opportunity (TXOP). The length of the TXOP depends on regulation and type of CCA that has been performed, but typically ranges from 1-10 ms.

In the energy detection (ED) technique used in NR-U, the transmitter looks for the energy level in channel over a time period compared to a certain threshold (ED threshold) in order to determine if the channel is idle or occupied/busy. If the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has gained access to a channel, the transmitter is only allowed to perform transmission up to a maximum time duration (i.e., maximum channel occupancy time, MCOT). For quality of service (QoS) differentiation, a channel access priority based on the service type has been defined. For example, four LBT priority classes are defined for differentiation of contention window sizes (CWS) and MCOT between services.

Some devices (e.g., UEs) may be capable of transmitting (and receiving) over a wide bandwidth including multiple sub-bands/channels. A device is only allowed to transmit on the sub-bands in which the medium is sensed as free. As with single bands, there are various ways LBT sensing should be done when multiple sub-bands are involved. In principle, there are two ways a device can operate over multiple sub-bands. One way is that the transmitter/receiver bandwidth is changed depending on which sub-bands that were sensed as free. In this setup, there is only one component carrier (CC) and the multiple sub-bands are treated as single channel with a larger bandwidth. The other way is that the device operates almost independent processing chains for each channel. Depending on how independent the processing chains are, this option can be referred to as either carrier aggregation (CA) or dual connectivity (DC).

License Assisted Access (LAA) is a feature of LTE that leverages the unlicensed 5 GHz band in combination with licensed spectrum to deliver a performance boost for wireless device users. It uses CA in the downlink to combine LTE in the unlicensed 5-GHz band with LTE in the licensed band to provide better data rates and a better user experience. Since LAA operates in the 5-GHz band where operates, it must: be able to co-exist, with by avoiding channels that are being used by Wi-Fi users. LAA uses LBT to dynamically select a 5-GHz-band channel(s) that is(are) not being used—a "clear channel." If no clear channel is available, LAA will share a channel fairly with others.

In general, LTE LAA supports UE measurement reports for unlicensed spectrum based on measurements of averaged RSSI and channel occupancy (CO). In general, CO is defined as percentage of time that RSSI was measured above a configured threshold. For this purpose, a UE can be configured with a RSSI measurement timing configuration (RMTC) that includes a measurement duration (e.g., 1-5 ms) and a period between measurements (e.g. {40, 80, 160, 320, 640} ms). It has been agreed in NR-U to also support measurement of CO. The LTE LAA rules regarding CO are used as a baseline for NR-U.

As briefly mentioned above, if a UE experiences LBT problems in its current active BWP, it is beneficial for the UE to attempt random access (RA) in another configured BWP. When the UE has detected LBT failures in all configured BWPs, the UE can trigger RLF due to LBT failure. On the other hand, various other conditions (e.g., handover failure to a target cell) can cause the UE to trigger RLF much earlier. This inconsistent behavior can lead to various problems, issues, and/or difficulties for UE operation in unlicensed bands, particularly for handovers. This is discussed in more detail below, after the following description of NR network architectures and radio interface.

Figure 3:
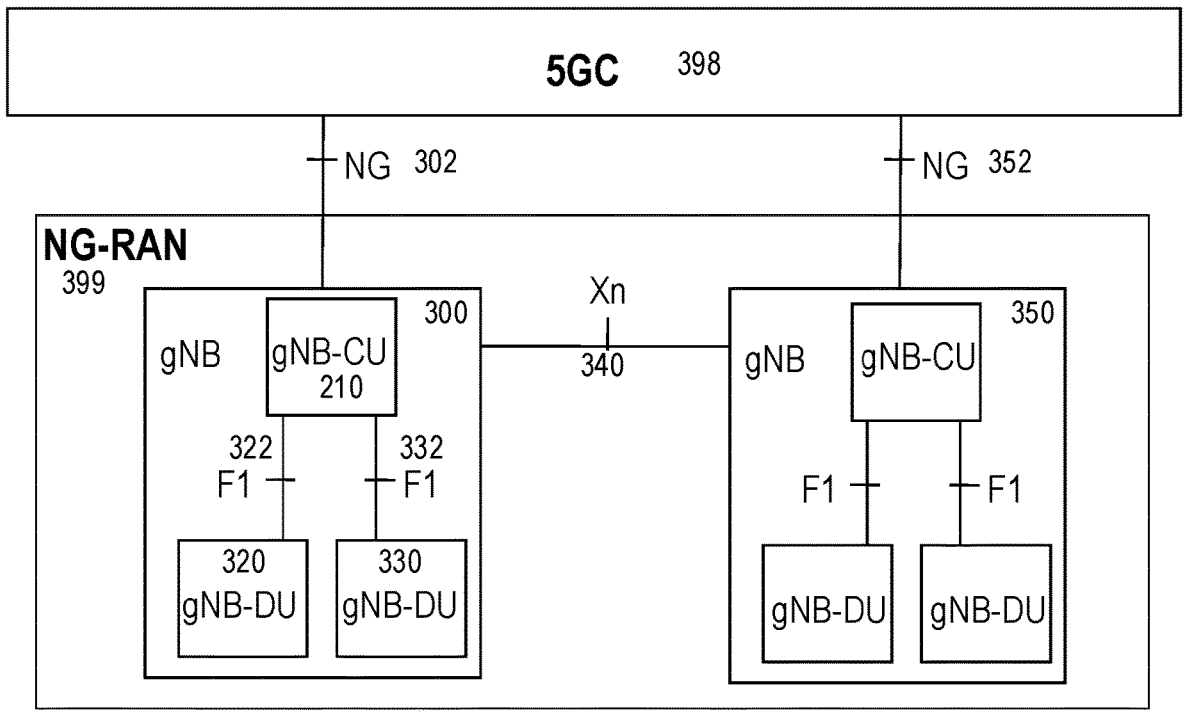
FIGS. 3-4 illustrate two high-level views of an exemplary 5G network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 340. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU.

Figure 4:
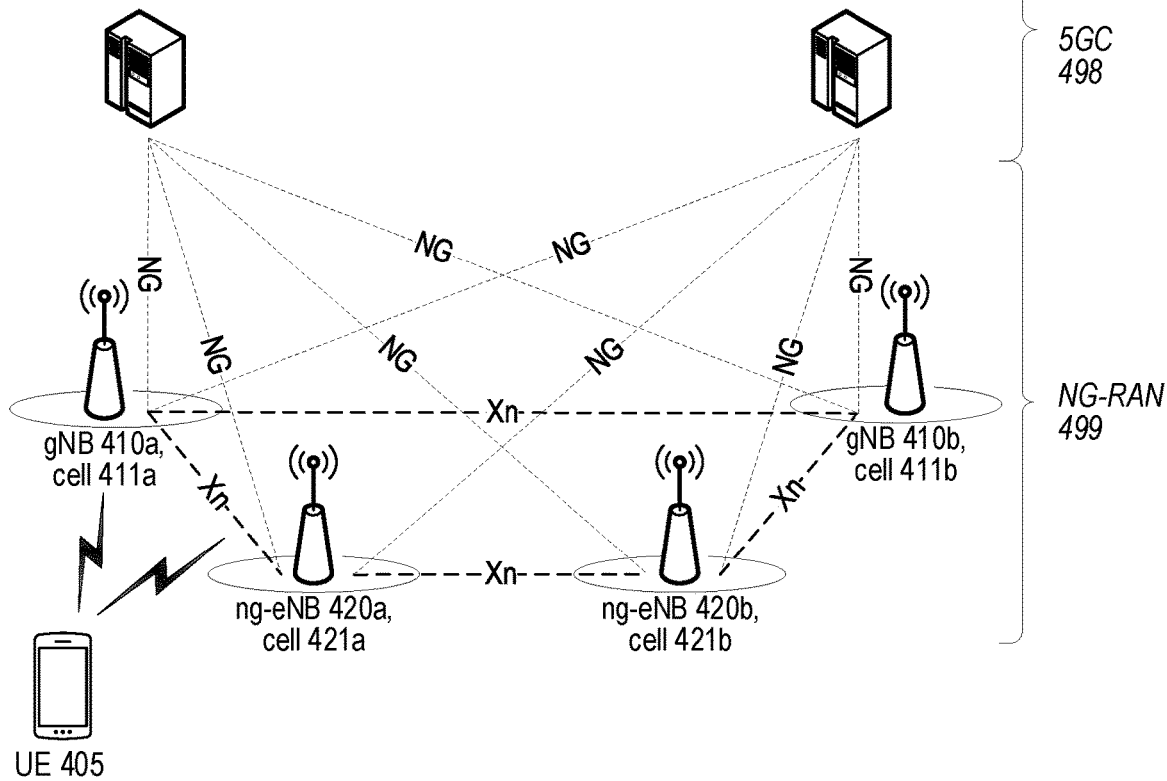

FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430a, b) via respective NG-C interfaces and to the UPF (User Plane Function) 440 (e.g., UPFs 440a,b) via respective NG-U interfaces. Moreover, the AMFs 430a,b can communicate with one or more policy control functions (PCFs, e.g., PCFs 450a,b) and network exposure functions (NEFs, e.g., NEFs 460a,b).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. As mentioned above, the gNBs and ng-eNBs can also use various directional beams to provide coverage in the respective cells. Depending on the particular cell in which it is located, a UE 405 can communicate with the gNB or ng-eNB serving that particular cell via the NR or LTE radio interface, respectively.

Bay way of example, cell 411a may act as a source cell, and cell 411b may act as a target cell with respect to UE 405 performing or initiating a handover from source cell to target cell.

Figure 5:
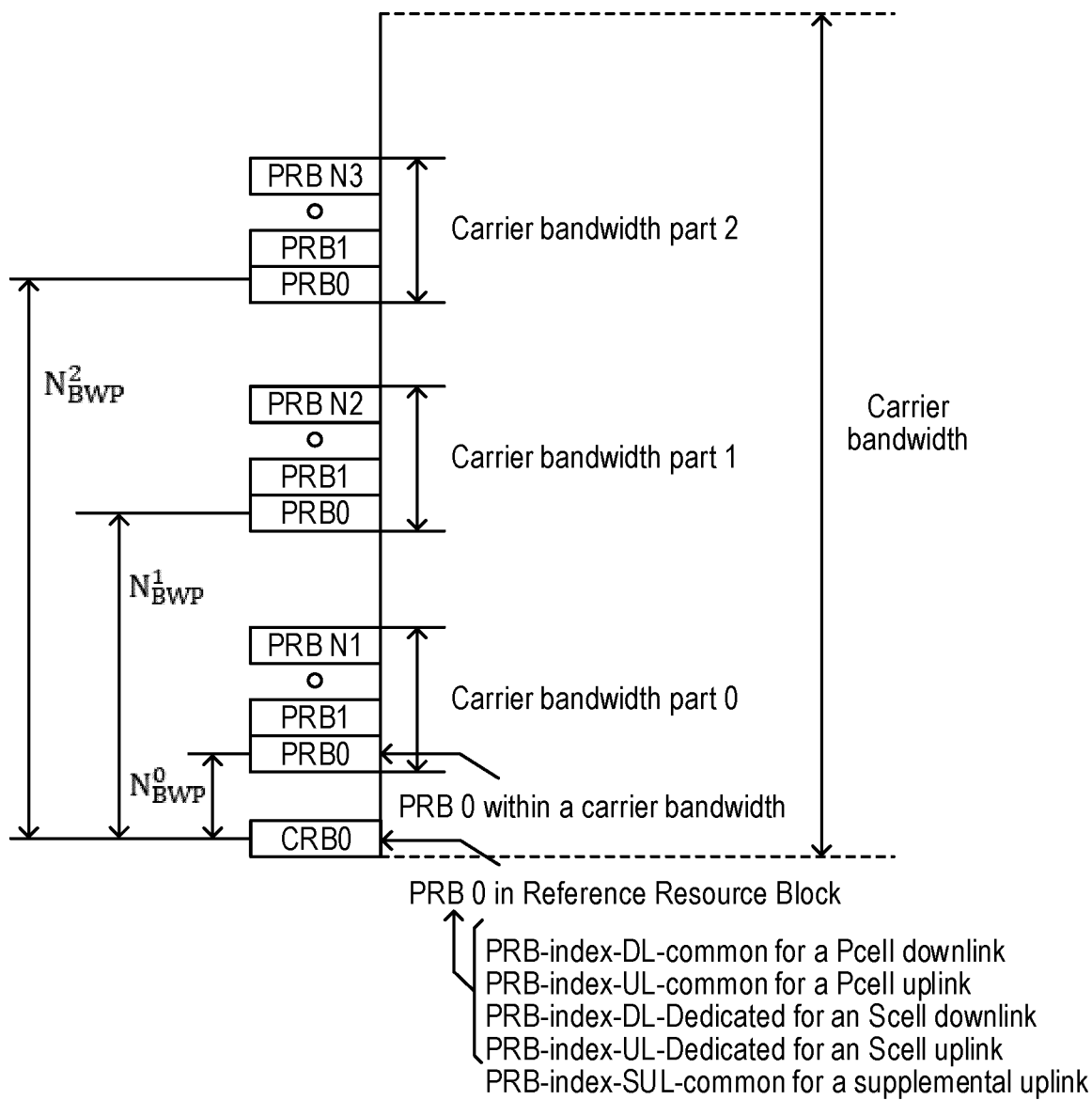
FIG. 5 shows an exemplary frequency-domain configuration for a 5G/NR UE.

FIG. 5 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from zero to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWP_i}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15\times 2^\mu)$ kHz, where $\mu\in(0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^\mu*50$ MHz.

Table 1 below summarizes the supported NR numerologies and associated parameters. Different DL and UL numerologies can be configured by the network.

TABLE 1

| μ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 6:
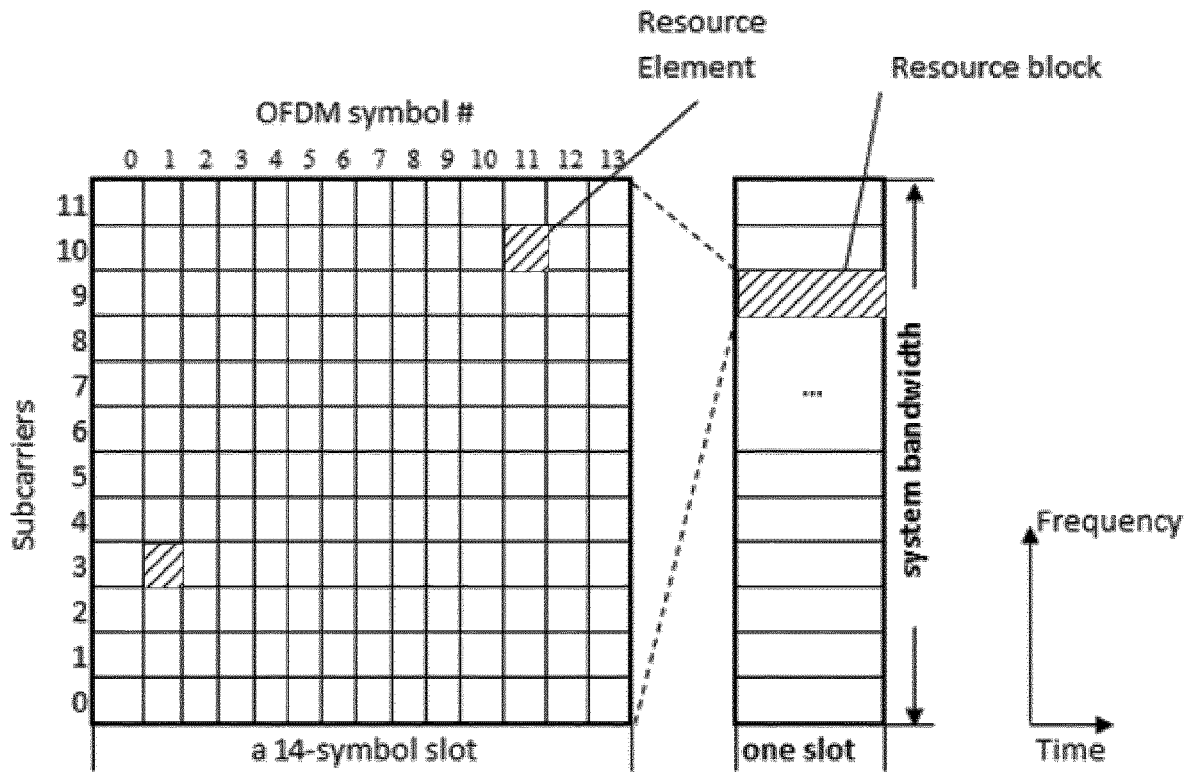
FIG. 6 shows an exemplary time-frequency resource grid for an NR (e.g., 5G) slot.

FIG. 6 shows an exemplary time-frequency resource grid for an NR slot. As illustrated in FIG. 6, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix and 12 symbols for extended cyclic prefix.

Figure 7A:
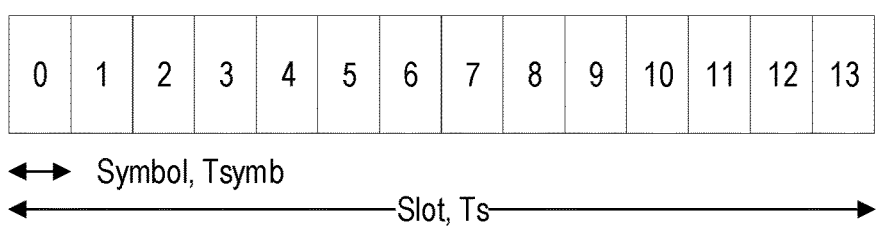
FIGS. 7A-7B, shows exemplary NR slot and mini-slot configurations.
Figure 7B:
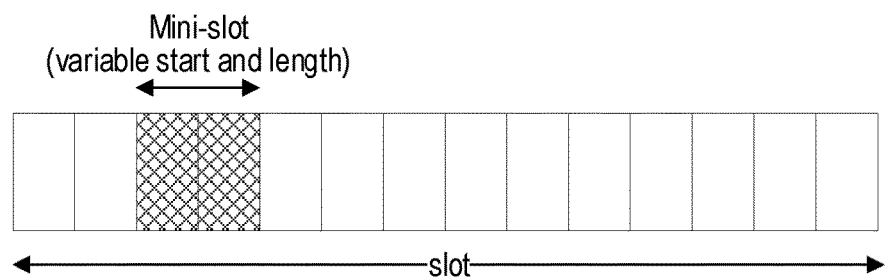

FIG. 7A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. FIG. 7B shows an exemplary mini-slot arrangement in which the mini-slot begins in the third symbol of the slot and is two symbols in duration. Applications of mini-slots include unlicensed spectrum and latency-critical transmission (e.g., URLLC). However, mini-slots are not service-specific and can also be used for eMBB or other services.

In NR, PDCCH is confined to a region referred to as control resource set (CORESET). A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe. In NR, however, each REG consists of all 12 REs of one OFDM symbol in a RB, whereas an LTE REG includes only four REs. The CORESET time domain size can be configured by an RRC parameter. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine the CCEs corresponding to PDCCH candidates that a UE must monitor within a search space set. The hashing is done differently for different UEs. In this manner, the CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI addressed to it and follows the instructions (e.g., scheduling information) contained in the DCI.

For example, to determine the modulation order, target code rate, and TB size(s) for a scheduled PDSCH transmission, the UE first reads the five-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (u) and the total number of allocated PRBs before rate matching ($n_{PRB}$), the UE determines the TB Size (TBS) for the PDSCH according to the procedure defined in 3GPP TS 38.214 V15.0.0 clause 5.1.3.2.

The principle of radio link monitoring (RLM) is similar in LTE and NR. The purpose is to monitor the radio link quality of the UE's serving cell and use that information to decide whether the UE is in-sync (IS) or out-of-sync (OOS) with respect to that serving cell. One of the main intentions of RLF procedure in LTE was to assist the UE to perform a fast and reliable recovery in RRC_CONNECTED state without going via RRC_IDLE. It is beneficial to avoid unnecessary latency due to the RACH access and RRC connection establishment from RRC_IDLE.

In LTE, RLM is carried out by UE measuring downlink reference signals (e.g., CRS) in RRC_CONNECTED state. If RLM indicates number of consecutive OOS conditions, then the UE starts a radio link failure (RLF) procedure and declares RLF after expiry of a timer (e.g., T310). The actual procedure is carried out by comparing the estimated CRS measurements to some target block error rates (BLERs), called Qout and Qin. In particular, Qout and Qin correspond to BLER of hypothetical PDCCH/PCIFCH transmissions from the serving cell, with exemplary values of 10% and 2%, respectively. In NR, the network can define the RS type (e.g., CSI-RS and/or SSB), exact resources to be monitored, and even the BLER target for IS and OOS indications.

Figure 8:
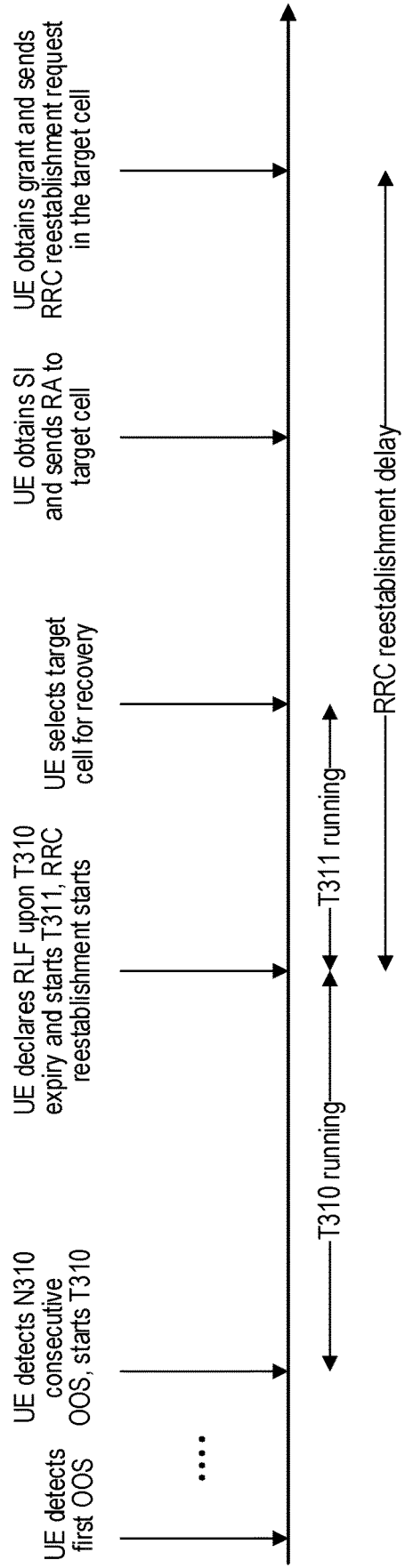
FIG. 8 shows a timeline of any exemplary radio link monitoring (RLM) procedure for LTE.

FIG. 8 shows a timeline of any exemplary radio link monitoring (RLM) procedure for LTE. In this example, the UE detects N310 consecutive OOS conditions and then initiates timer T310. After expiry of T310, the UE starts T311 and starts RRC reestablishment. After selecting a target cell for reestablishment, the UE obtains system information (SI) for the target cell and performs a random access (e.g., via RACH). Ultimately, the UE obtains access to the target cell and sends an RRC Reestablishment Request message to the target cell, with an overall delay after initiating reestablishment.

In addition to T310 expiry, an LTE UE may also experience RLF due to a reaching a maximum number of RLC retransmission or due to handover failure after timer T304 expiry. During handover procedure, T304 is started when the UE receives a handover command from the source cell, with the value of the timer T304 set to allow the UE to try the maximum random-access attempts to the target cell. When the timer T304 is expired, a radio link failure due to handover is detected.

When a radio link failure is triggered for any of the above reasons, the radio connection re-establishment is triggered. An LTE UE shall first perform cell search to determine the best cell for radio link re-establishment. According to 3GPP TS 36.300, a UE can select the same cell, a different cell from the same eNB, or a prepared cell from a different eNB, wherein the activity can be resumed (i.e., the UE stays in connected mode) via radio connection re-establishment procedure since the previous UE context can be retrieved by inter-cell communication. In general, a prepared eNB (providing a "prepared cell") is an eNB which has admitted the UE during an earlier executed handover preparation phase or has obtained the UE's context.

However, when a prepared cell is not available, the UE selects an unprepared cell. In this case, the UE has to go to RRC_IDLE state and try to setup the radio connection afterwards. In this case, activity of the UE cannot be resumed. Table 2 below (which is Table 10.1.6-1 from 3GPP TS 36.300) guides the UE behavior for target cell selection.

TABLE 2

| Cases | First Phase | Second Phase | T2 expired |
|---|---|---|---|
| UE returns to the same cell | Continue as if no radio problems occurred | Activity is resumed by means of explicit signalling between UE and eNB | Go via RRC_IDLE |
| UE selects a different cell from the same eNB | N/A | Activity is resumed by means of explicit signalling between UE and eNB | Go via RRC_IDLE |
| UE selects a cell of a prepared eNB | N/A | Activity is resumed by means of explicit signalling between UE and eNB | Go via RRC_IDLE |
| UE selects a cell of a different eNB that is not prepared | N/A | Go via RRC_IDLE | Go via RRC_IDLE |

During RLM, the monitored RSs may be subject to LBT failures. Therefore, a UE may miss one or several RS receptions, which would impact triggering of RLF. In addition, LBT failures will cause a UE to forego or drop certain uplink transmission. This can affect how to manage the counters of different MAC procedures, e.g., preamble counters or scheduling request (SR) counters. For example, if the preamble counter is not incremented, the UE may delay entering RLF procedure, which may be undesirable. One way to mitigate this problem is a separate counter of LBT failures for RA transmission, such that the UE can trigger RLF if the counter reaches a maximum value.

In 3GPP, a beam failure detection (BFD)-like mechanism has been agreed for detection of UL LBT failures. This would reduce the work efforts for the 3GPP to design detection mechanism. The MAC entity may be configured by RRC with a consistent LBT failure recovery procedure. Consistent LBT failure is detected per UL BWP by counting LBT failure indications, for all UL transmissions, from the lower layers to the MAC entity.

In relation to this procedure, RRC layer configures the following parameters in lbt-FailureRecoveryConfig:
  lbt-FailureInstanceMaxCount for the consistent LBT failure detection; and
  lbt-FailureDetectionTimer for the consistent LBT failure detection;
In addition, the UE uses an LBT_COUNTER variable for counting indicates of LBT failure detection procedure, with the counter initially set to 0.

For each activated Serving Cell configured with lbt-FailureRecoveryConfig, the following procedural code illustrates a simplified MAC procedure for LBT failure recovery. The detailed procedure would be different depending on whether consistent UL LBT failures are detected in the primary cell (PCell or PSCell) or in an SCell.
  1> if LBT failure indication has been received from lower layers:
    2> start or restart the lbt-FailureDetectionTimer;
    2> increment LBT_COUNTER by 1;
    2> if LBT_COUNTER>=lbt-FailureInstanceMaxCount:
      3> declare consistent LBT failures for the active UL BWP
  1> if the lbt-FailureDetectionTimer expires; or
  1> if lbt-FailureDetectionTimer or lbt-FailureInstanceMaxCount is reconfigured by upper layers:
    2> set LBT_COUNTER to 0.

UL LBT failure handling should be operated per BWP, and as discussed above, a UE may be configured with several BWPs. The UE maintains timer and a counter for each configured BWP. Whenever the UE switches to a different active BWP, the UE uses the timer and the counter in the new active BWP for detection of UL LBT failures. At the same time, the UE resets the timer and the counter in the de-activated BWP. If the active BWP comprises several LBT sub-bands, it is enough for the UE to keep a common counter across LBT sub-bands with the same BWP. In other words, an UL LBT problem is only declared in case the number of LBT failures from all LBT sub-bands has reached a predefined counter.

Figure 9:
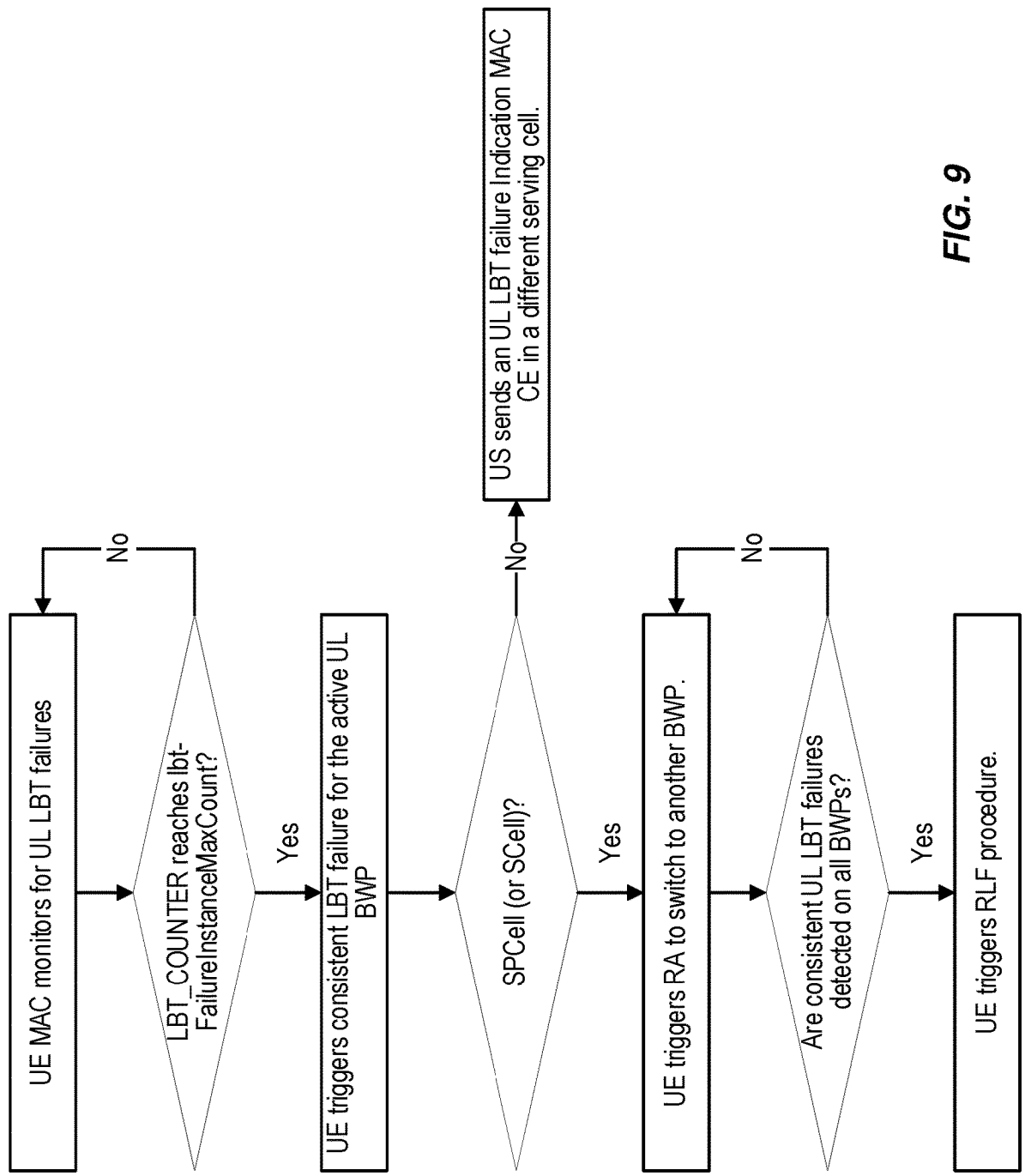
FIG. 9 shows a flowchart illustrating an exemplary listen-before-talk (LBT) failure recovery procedure.

FIG. 9 shows a flowchart illustrating an exemplary LBT recovery procedure in accordance with the following description. If a UE experiences LBT problems in its current active BWP, it is beneficial for the UE to switch to another BWP prior to triggering a RLF. As such, the UE initiates a RA on an inactive BWP which has PRACH resources configured. Upon reception of the RA, the gNB can decide if the UE needs to switch to the other BWP. The gNB can reply with a DCI or an RRC reconfiguration indicating the new BWP which may be a different one from the BWP selected by the UE for RA. After switching to the new active BWP, the UE can reset the counter for LBT problem detection.

If the UE has detected LBT problems for all configured BWPs with RA configured, the UE may declare an RLF for the cell and trigger RRC connection reestablishment. In case an RLF event is triggered, the UE would follow the existing RRC connection reestablishment procedure to recover from the failure.

For a UE configured with secondary cells (SCells) for carrier aggregation (CA), if the UE has detected consistent UL LBT failures in an SCell, the UE informs the gNB of the occurrence of the LBT failures. The gNB can take appropriate recovery actions, for example, to inactivate or de-configure the cell where the UL LBT failures have been detected. When consistent uplink LBT failures are detected on an SCell, a new MAC CE (e.g., UL LBT failure Indication MAC CE) has been defined to report this occurrence to the node (e.g., gNB) associated with the SCell. The new MAC CE can indicate the cell in which consistent UL LBT failures has been detected. The gNB knows in which BWP the UE is currently active and since a UE only has one active BWP per cell, upon reception of the MAC CE the gNB can understand that the UE has experienced consistent UL LBT failures in its current active BWP in the indicated cell. The MAC CE format supports multiple entries to indicate all the cells which have already declared consistent UL LBT failures.

As such, when consistent UL LBT failures is detected in a BWP of an SCell, the MAC entity will trigger a UL LBT failure MAC CE. If there is available UL grant in any serving cell for a new transmission, the UE will indicate to the multiplexing-and-assembly entity to include a UL LBT failure MAC CE in the subsequent uplink transmission. If there is no UL grant available, the UE shall trigger a scheduling request for requesting new UL resource for the MAC CE.

This new MAC CE is also applicable to a primary cell in CA (e.g., PCell or PSCell). In the primary cell, the UE switches to another BWP and initiates RACH upon declaration of consistent LBT failures. During the RACH procedure especially for a CBRA based procedure, the UE can include the UL LBT failure Indication MAC CE in a message (e.g., Msg3 of the RA procedure) so that the gNB can identify why the RA procedure was triggered by the UE. When consistent uplink LBT failures are detected on the PSCell, the UE informs MN via the SCG failure information procedure after detecting consistent UL LBT failures on all configured BWPs.

Figure 10:
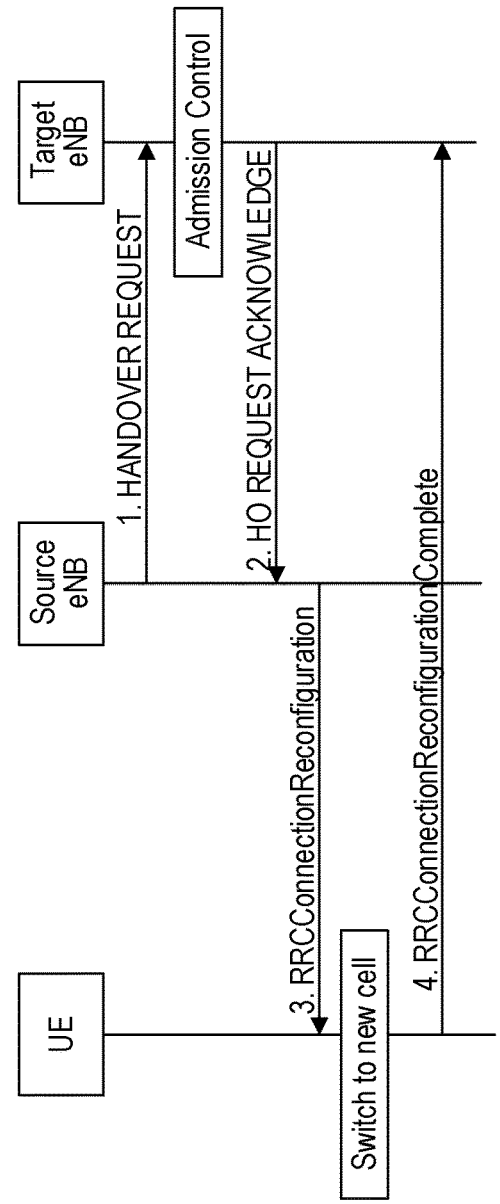
FIG. 10 shows a signal flow diagram for an exemplary procedure for handover of a UE from a source node (or gNB) to a target node (or gNB), as further specified in 3GPP TS 38.300 (v16.0.0).

FIG. 10 shows a signal flow diagram for an exemplary procedure for handover of a UE from a source node (or gNB) to a target node (or gNB), as further specified in 3GPP TS 38.300 (v16.0.0). More specifically, in the exemplary procedure, the UE is handed over from a source cell served by the source gNB to a target cell served by the target gNB. More generally, this handover procedure is one form of cell-level mobility that requires explicit RRC signaling. Although some of the operations shown in FIG. 10 are given numerical labels, this is merely to facilitate explanation and neither requires nor implies that the operations be performed in the numerical order (unless specifically noted to the contrary).

In operation 1, the source gNB initiates handover and sends a HANDOVER REQUEST message over the Xn interface (e.g., as shown in FIGS. 3-4) to the target gNB. In operation 2, the target gNB performs admission control and provides a new RRC configuration for the UE as part of the HANDOVER REQUEST ACKNOWLEDGE message sent to the source gNB. In operation 3, the source gNB provides the new RRC configuration to the UE by forwarding an RRCReconfiguration message received in the HANDOVER REQUEST ACKNOWLEDGE message (i.e., in operation 2). The RRCReconfiguration message includes at least cell ID and all information required to access the target cell so that the UE can access the target cell without reading system information. For some cases, the information required for contention-based and contention-free random access can be included in the RRCReconfiguration message. The access information to the target cell may include beam specific information, if any. In operation 4, the UE moves the RRC connection to the target gNB and replies with the RRCReconfigurationComplete message. User Data can also be sent in operation 4 if an UL grant is provided.

The RRC-triggered handover illustrated in FIG. 10 requires the UE at least to reset its MAC entity and re-establish RLC. RRC-triggered handovers with and without PDCP entity re-establishment are supported. For data radio bearers (DRBs) using RLC acknowledged mode (AM), PDCP can either be re-established together with a security key change or a data recovery procedure can be initiated without a key change. For DRBs using RLC unacknowledged mode (UM) and for SRBs, PDCP can either be re-established together with a security key change or remain as it is without a key change. Moreover, data forwarding, in-sequence delivery and duplication avoidance at handover can be guaranteed when the target gNB uses the same DRB configuration as the source gNB.

In addition to the successful RRC-triggered handover illustrated in FIG. 10, timer-triggered handover failure procedures are also supported in NR. An RRC connection re-establishment procedure is used by the UE to recover from handover failure.

The RRCReconfiguration message transmitted to the UE in FIG. 10 operation 3 contains the configuration of the target cell, including RA configurations and the LBT-FailureRecoveryConfig parameter discussed above. To be able to complete operation 4 above, the UE will perform a RA procedure to the target call (also needed to acquire UL synchronization) in order to receive an UL grant to transmit the RRCReconfigurationComplete message. Failure to transmit RRCReconfigurationComplete can be caused by failure of the RA procedure or expiry of the T304 timer, and in either case leads to handover failure. In NR-U, the RA procedure is more error prone due to the requirement to perform LBT before RA transmissions. Failure of the RA procedure will trigger RLF, leading to an RRC connection re-establishment procedure.

Even so, the conventional handover procedure shown in FIG. 10 can cause relatively long interruptions to the UE. To address the shortcomings of conventional solutions and to achieve ~zero interruption time, an enhanced version of make-before-break (eMBB) is being considered in 3GPP Rel-16 both for LTE and NR. This enhanced version is based on an assumption that the UE is capable of simultaneously transmitting and receiving from both the source and the target cell. In practice, this may require that the UE is equipped with dual transmit/receive (TX/RX) chains. The dual TX/RX chains potentially also allow eMBB to be used in other handover scenarios, e.g., inter-frequency handover.

Figure 11:
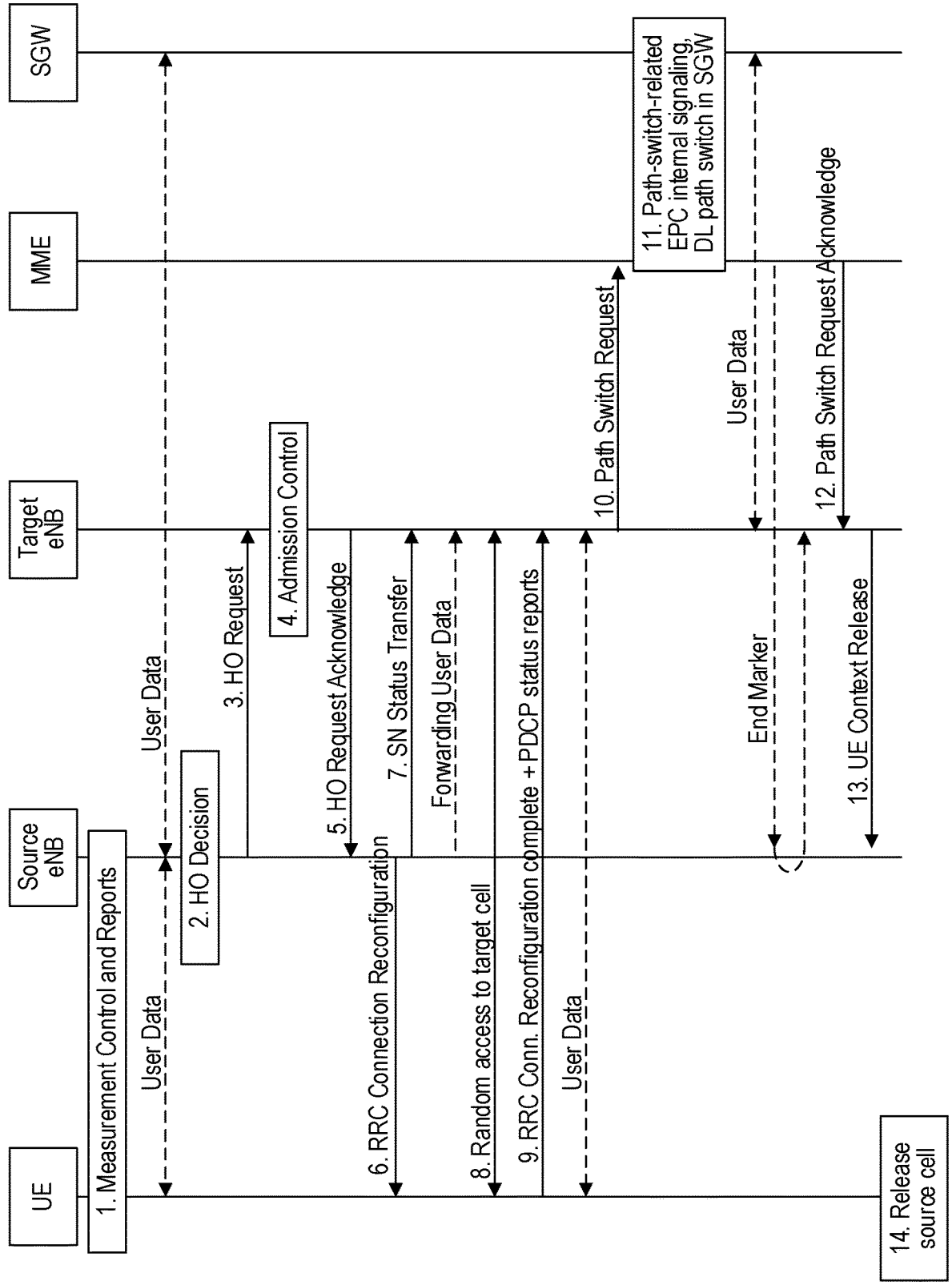
FIG. 11 shows an exemplary enhanced make-before-break (eMBB) inter-node handover of a UE between a source eNB and a target eNB.

FIG. 11 shows an exemplary eMBB inter-node handover of a UE between two LTE eNBs, i.e., a source eNB and a target eNB. Although some of the operations shown in FIG. 11 are given numerical labels, this is merely to facilitate explanation and neither requires nor implies that the operations be performed in the numerical order (unless specifically noted to the contrary). The following discussion addresses the main differences and/or highlights of the procedure shown in FIG. 11 relative to other conventional procedures.

In operation 6, the UE receives an "eMBB" indication in the handover command (i.e., RRCConnectionReconfiguration message) from the source eNB. Based on this indication, the UE maintains the connection to the source eNB while establishing the connection to the target eNB. That is, the UE can send and receive user plane data via the source eNB between operations 6 and 9 without any interruption. After operation 9, UE is able to send and receive user plane data via the target eNB similar to the regular HO procedure.

In operation 7, the source eNB sends an SN Status Transfer message to the target eNB, indicating UL PDCP receiver status and the sequence number (SN) of the first DL PDCP SDU to be forwarded. The UL PDCP SN receiver status includes at least the PDCP SN of the first missing UL SDU and may include a bit map of the receive status of the out-of-sequence UL SDUs that the UE needs to retransmit in the target cell, if there are any such SDUs. The SN Status Transfer message can also include the Hyper Frame Number (HFN) of the first missing UL SDU as well as the HFN DL status for COUNT preservation in the target eNB.

Once the connection setup with the target eNB is successful, the UE send the RRCConnectionReconfigurationComplete message in operation 9 and is able to maintains two data links, one to the source eNB and one to the target eNB. After operation 9, the UE transmits the UL user plane data to the target eNB, similar to the regular handover procedure, using the target eNB security keys and compression context. Thus, there is no need for UL user plane data transmission to both nodes, thereby avoiding UE power splitting between two nodes and simplifying UE implementation. In the case of intra-frequency handover, transmitting UL user plane data to one node at a time also reduces UL interference which increases the chance of successful decoding at the network side.

Even so, the UE needs to maintain the security and compression context for both source access node and target access node until the source link is released. The UE can determine the security/compression context to be used for a PDCP PDU based on the cell in which the PDU is transmitted. To avoid packet duplication, the UE may send a PDCP status report together with the RRCConnectionReconfigurationComplete message in operation 9, indicating the last received PDCP SN. Based on the PDCP status report, the target eNB can avoid sending to the UE PDCP PDUs with sequence numbers identical to the PDCP packets which were already received by the UE in the source cell.

The release of the source cell in operation 14 can be triggered by an explicit message from the target eNB (not shown in the figure) or by some other event, e.g., expiry of a release timer.

As an alternative to source access node starting packet data forwarding after sending the RRCConnectionReconfiguration message to the UE in operation 6, the target eNB may indicate to the source eNB when to start packet data forwarding. For instance, the packet data forwarding may start at a later stage when the link to the target cell has been established, e.g., after the UE has performed random access in the target cell. By starting the packet data forwarding in the source eNB at a later stage, the number of duplicated PDCP SDUs received by the UE from the target cell will potentially be less such that DL latency can be somewhat reduced. However, starting packet data forwarding at a later stage is also a trade-off between robustness and reduced latency. For example, the connection between the UE and the source eNB can lost before the connection to the target eNB is established. In such case, there will be a short interruption in DL data transfer to the UE.

Figure 12:
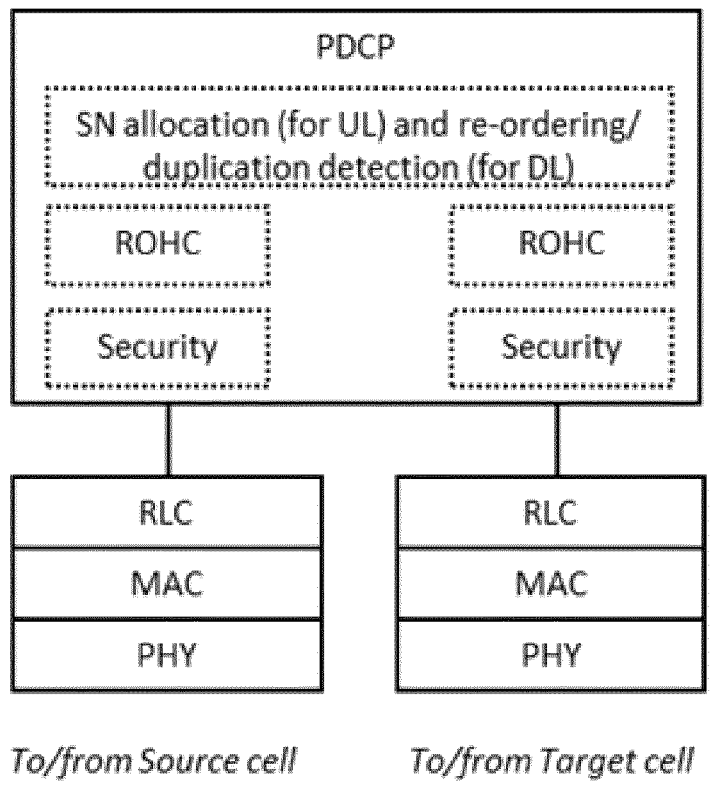
FIG. 12 shows an exemplary UE dual-access protocol stack (DAPS) for eMBB.

FIG. 12 shows an exemplary UE user-plane protocol stack for eMBB. This protocol stack is also referred to as Dual Active Protocol Stack (DAPS). Each user plane radio bearer has an associated PDCP entity which in turn has two associated RLC entities—one for the source cell and one for the target cell. The PDCP entity uses different security keys and ROHC contexts for source and target cells. However, the PDCP entity uses common SN allocation (for UL transmission) and re-ordering/duplication detection (for DL reception) for both source and target cells.

The exemplary UE protocol stack shown in FIG. 12 is generally applicable for LTE. In case of NR, there is an additional protocol layer called SDAP on top of PDCP that is not shown in FIG. 12. SDAP is responsible for mapping QoS flows to bearers.

Returning to the above discussion about LBT failures, in NR Rel-16, the MAC entity may be configured by RRC with a consistent LBT failure recovery procedure using the parameters in the IE lbt-FailureRecoveryConfig. Consistent LBT failure is detected per UL BWP by the UE counting LBT failure indications, for all UL transmissions, from the lower layers to the MAC entity.

For handover and PSCell addition without the DAPS shown in FIG. 12, lbt-FailureRecoveryConfig for the target cell can be signaled in the handover command, which for NR is an RRCReconfiguration message including reconfigurationWithSync. Upon reception of this message, UE reconfigures the MAC entity, specifically the MAC main configuration of the cell group (e.g., MCG or SCG) in accordance with the received mac-CellGroupConfig excluding tagToReleaseList and tag-ToAddModList. Based on this action, the UE will have a valid LBT failure recovery configuration for the target cell prior to accessing to that cell. As such, the UE can apply UL LBT failure recovery during the handover to the target cell. Even so, upon occurrence of consistent UL LBT failure in the target cell, both UL LBT failure recovery and handover may lead to RLF.

When the UE is executing a RA procedure towards the target cell during handover, there are two events or processes which may cause the UE to trigger failure. The first is handover failure, in which the UE either reaches the maximum number of preamble transmissions or timer T304 expires. Both of these will trigger RLF and RRC connection re-establishment. The second is the UL LBT failure handling mechanism, which is triggered if lbt-FailureInstanceMaxCount is reached. If this event occurs, the UE declares consistent LBT failures for the active UL BWP. Prior to triggering RLF, however, the UL LBT failure handling allows the UE to switch to another BWP if it is available (e.g., configured) for the target cell. When the UE has detected LBT failures in all BWPs, the UE can trigger RLF.

Depending on which of these processes is triggered first, the impacts on performance may be very different. Typically, consistent LBT failures will allow the UE to switch BWP and retry the RA procedure on the new BWP while RLF triggered by handover failure will lead to RRC connection re-establishment and, consequently, a longer interruption to the UE.

Exemplary embodiments of the present disclosure can address these and other issues, problems, and/or difficulties by providing enhanced techniques for configuring a UE (e.g., via RRCReconfiguration or RRCConnectionReconfiguration message) with more than one BWP that includes RA resources. Given this information, the UE can try a second RA procedure on a second BWP in case a first RA procedure on a first BWP does not succeed. In other words, instead of triggering RLF when the first RA procedure fails, the UE can initiate a second RA procedure on a second BWP that, if successful, can facilitate transmission of an RRCReconfigurationComplete message needed to complete handover.

In various embodiments, different UE actions may be configured by different T304 timer settings and lbt-FailureInstanceMaxCount contents. In some embodiments, different UE actions can also be achieved by not allowing the T304 to expire, e.g., by not configuring it or to configure it to infinite. In some embodiments, different UE actions can also be achieved by ignoring lbt-failurerecoveryConfig even if it is carried in the RRCReconfiguration message, thereby avoiding declaring consistent LBT failures for the active UL BWP and instead trying a second RA procedure on a second BWP with configured RA resources (or, alternately, triggering RLF).

Such embodiments can provide various improvements, benefits, and/or advantages. For example, such embodiments can facilitate additional robustness and/or reliability of handover in unlicensed spectrum (e.g., for NR-U). For example, such embodiments can also reduce latency of handover in unlicensed spectrum (e.g., for NR-U). Furthermore, such embodiments can mitigate and/or reduce interruptions to UE services due to handover and/or LBT failures, thereby facilitating use of services (e.g., eMBB, URLLC, etc.) on unlicensed spectrum.

Various embodiments are described below in the context of NR-U operation. However, NR-U is merely used as an example to facilitate explanation and understanding, such that these and other embodiments are also applicable to other systems arranged for unlicensed operation, such as LTE LAA, MuLteFire, etc. Furthermore, these and other embodiments are also applicable to a licensed operation where the medium or channel is shared between different clients, with each client using a channel sensing mechanism (e.g., LBT) prior to a transmission.

In various embodiments, e.g. during a non-DAPS based handover to a target cell in unlicensed band, upon detection of consistent LBT failure in the target cell, the UE can be configured (e.g., via RRC signaling) to perform one of the following two options:

1) An LBT failure handling mechanism that allows the UE to reattempt failed UL transmissions in one or more different resources of the target cell in order to complete the mobility procedure (e.g., handover) towards the target cell prior to triggering RLF. This can reduce unnecessary latency and interruption to the UE compared to directly triggering RLF. The resources for reattempt can differ in frequency/subband/BWP, time, and/or spatial configuration as compared to the initial attempt.
2) Resume LBT failure handling in the target cell but rely on an existing timer in the handover procedure to trigger RLF. This option may give longer latency for UE completion of the handover but would require fewer 3GPP specification changes, and would not require a target node (e.g., gNB) to provide RA resources on multiple BWPs in a target cell.

In embodiments according to the first option above, the UE can attempt the initial UL transmissions based on performing a first RA procedure on first RA resources of the target cell, and reattempt the UL transmissions based on performing a second RA procedure on second RA resources of the target cell. As mentioned above, the second RA resources used for reattempt can differ from the first RA resources used for initial attempt in frequency/subband/BWP, time, and/or spatial configuration. In some embodiments, the UE can also perform further reattempts via third, fourth, etc. RA procedure on third, fourth, etc. RA resources for the target cell, if the initial reattempt via the second RA procedure was unsuccessful.

In some of these embodiments, the various RA resources of the target cell can be configured before the UE detects the failure event in the UE. For example, the configuration of the various RA resources can be provided in a RRCReconfiguration message such as included in a HO command or in a conditional HO configuration. When multiple RA resources the target cell are configured in this manner, the UE may select from the configured resources in an order that is based on a predefined rule, a sequence indicated by the target node serving the target cell, or autonomously (e.g., based on UE measurements and/or manufacturer-proprietary rule).

In some embodiments, the various RA resources of the target cell can be configured before the UE detects the failure event, but particular ones can be activated upon detecting the failure event. The UE can then reattempt the UL transmission using the activated resources in an order determined in any of the ways discussed above.

In some embodiments, the UE can be configured with RA resources for the target cell in both a normal UL carrier and a supplementary UL carrier. In such embodiments, the UE may be configured to initially attempt random access in a first available UL carrier with RA resources, either the supplementary UL carrier or on the normal UL carrier. In case the random access fails on the first available UL carrier, the UE can select the other of the two UL carriers for a RA reattempt. For example, the UE may initially select for random access an available UL carrier configured with RACH resources that has the higher reference signal received power (RSRP) or received signal strength (RSSI), and then switch to a second available UL carrier configured with RACH resources (e.g., with lower RSRP or RSSI), in case the UE fails random access on the first carrier.

In such embodiments, the handover procedure may be less sensitive to trigger RLF compared to the UL LBT failure handling procedure. As an example, handover-related timers such as T304 timer may not be configured or started, or may be suspended or configured to infinity. In addition, the maximum number of preamble transmissions may be configured to infinity or a very high number. With these settings, the UE will not trigger RLF failure due to expiry of a handover-related timer such as T304. Instead, the UE will need to rely on reaching the lbt-FailureInstanceMaxCount and declaring of consistent UL LBT failure. Once this is declared, the UE can retry on configured RA resources in a different frequency region (e.g., BWP, subband, etc.), or retry in the same frequency region as the initial attempt but in different time slots where RA resources are configured. When all the RA resources in frequency and time domains have been exhausted (e.g., consistent UL LBT failure declared on all BWPs), the UE can declare RLF.

In embodiments according to the second option above, the UE can be configured to only rely on the handover procedure to trigger RLF even if consistent UL LBT failures are being detected in the target cell. In this manner, the UL LBT failure handling mechanism in the target cell (if configured) can be less sensitive to trigger RLF compared to the handover procedure. As another alternative, as discussed above for the first option, instead of declaring RLF directly upon expiry of the handover timer such as T304, the UE can retry on configured RA resources in a different frequency region (e.g., BWP, subband, etc.), or retry in the same frequency region as the initial attempt but in different time slots where RA resources are configured. When all the RA resources in frequency and time domains have been exhausted (e.g., consistent UL LBT failure declared on all BWPs), the UE can declare RLF.

In some of these embodiments, the UE can suspend or stop a timer, a counter, or a procedure related to UL LBT failure detection or recovery in the target cell. Once suspended or stopped, it can be resumed after failing a UE procedure (e.g., handover) or it can be started in the target cell after completing the UE procedure. Alternatively, the LBT-FailureRecoveryConfig parameters may not be configured, such that detection of consistent uplink LBT failures is disabled. Alternatively, the LBT-FailureRecoveryConfig parameters can be configured to values that are unlikely to result in declaration of consistent UL LBT failure before the UE has triggered RLF due to expiry of the handover timer.

In other of these embodiments, the T304 timer can be configured and/or the maximum number of preamble transmissions can be configured to values that are relatively low respectively. With such settings, the UE will typically trigger RLF due to expiration of the handover timer such as T304 even if consistent UL LBT failures are being detected in the target cell.

Certain other embodiments of the present disclosure are applicable to both of the options discussed above. In some embodiments, if a UE has been experiencing consistent UL LBT failures in a first BWP in the target cell, the UE continues and retries on all BWPs configured with RA resources. This procedure can be configured by the RRCReconfiguration message, which may indicate the BWPs that should be tried and their order of use. When the UE experiences failure on all BWPs with RA resources, the UE can trigger RLF. Alternately, the UE may attempt RA on the BWPs in an order based on a predetermined rule, e.g. in ascending or descending order according to absolute frequency. Alternately, the UE can determine the order of use for the BWPs with RA resources based on information received from the network (e.g., serving node or target node).

In some embodiments, each BWP can be configured over one or multiple sub-bands or RB sets, where a sub-band can be 10 MHz or 20 MHz bandwidth. The UE can apply LBT on a sub-band basis. In such embodiments, the UE can receive from the network (e.g., from serving node in HO command) information about the load situation in each sub-band or RB set in which RA resources are configured. Such information can include, for example, received interference or power at the base station in each sub-band or RB set. In some embodiments, the UE can determine the order of use for BWPs with RA resources based on the load information. For example, the UE attempts RA on BWPs in sub-bands associated with increasing amount of load, as lower interference increases the probability of RA success.

In other embodiments, the UE can determine the order of use for BWPs with RA resources based on one or more frequency characteristics of the various BWPs. Examples of frequency characteristics include BWP bandwidth, frequency separation between the BWP and a previous BWP used for RA, etc. The order of use can be based on a predetermined or preconfigured rule, or it can be determined by the UE autonomously. In one example, the UE may try the RA on a BWP with the smallest bandwidth (e.g., 10 MHz instead of 20 MHz for other BWPs). This selection can be further conditioned on the amount of load in the smallest bandwidth according to network-provided statistics. For example, the UE can select the smallest BWP if interference power at the network node is below a threshold in that BWP. Otherwise, the UE can first select a larger BWP with satisfactory load (e.g., interference power below threshold) and, if unsuccessful, subsequently select the smallest BWP.

In other embodiments, the UE can determine the order of use for BWPs with RA resources based on information indicating the status of LBT in different sub-bands comprising the respective BWPs with RA resources. For example, the information can be expressed in terms of a bit map where each bit indicates the status of LBT in a particular sub-band, e.g. "0" means channel is unavailable due to LBT failure, "1" means channel is available due to LBT success (or vice versa). The UE switches to a sub-band where the channel is indicated as available and attempts RA on a BWP in the sub-band. If the channel is indicated available in multiple sub-bands, then the UE may select a sub-band (and BWP) for attempting RA autonomously or based on a predetermined order rule, including any of the relevant orders or rules discussed above.

In some embodiments, both two- and four-step RA resources can be configured on a BWP. In this case the UE can be configured to select either two- or four-step RA_TYPE according to normal procedures based on RSRP_THRESHOLD_RA_TYPE_SELECTION, or the UE can be configured to always start with the two-step RA procedure to minimize the impact of LBT. In other embodiments, if the RRCReconfigurationComplete message transmission fails on a BWP using the selected RA_TYPE (e.g., two-step), the UE may then retry using the other RA_TYPE (e.g., four-step) on the same BWP.

In some embodiments, both conventional contention-based (CBRA) and contention-free (CFRA) random access resources can be configured on a BWP. In this case, as an example, the UE could be allowed to fall back to two-step CBRA (e.g., after failed two-step CRFA) even if four-step CFRA is available, thereby minimizing the impact of LBT. In another example, the UE's selection between two- and four-step RA resources in a BWP can be associated with the particular value used to initialize a timer (e.g., T304) whose expiry caused the UE to declare RLF. For example, when the timer value (e.g., T304) is below a threshold the UE selects two-step RA resources in a BWP; otherwise, the UE selects four-step RA resources in a BWP. The relation to the threshold can also be reversed.

In other embodiments, the UE's selection between two- and four-step RA resources in a BWP can be associated with an amount of the time remaining before expiration of the timer that will cause the UE to declare RLF. For example, when the remaining time of the timer (e.g., T304) is below a threshold, the UE selects two-step RA resources in a BWP; otherwise, the UE selects four-step RA resources in a BWP. The relation to the threshold can also be reversed.

In some scenarios, a wideband BWP can be arranged into several subbands or channels. For example, in unlicensed operation, the UE can perform independent LBT operations on each subband or channel within a single BWP. In such embodiments, the various techniques discussed above in relation to BWPs are equally applicable to subbands or channels within a BWP. In other words, rules for ordering selection between BWPs configured with RA resources can be extended to encompass selection between subbands or channels (i.e., configured with RA resources) within and/or across the respective BWPs.

These embodiments described above can be further illustrated with reference to FIGS. 13-14, which depicts exemplary methods performed by a UE and a network node, respectively. In other words, various features of the operations described below, with reference to FIGS. 13-14, correspond to various embodiments described above.

Figure 13:
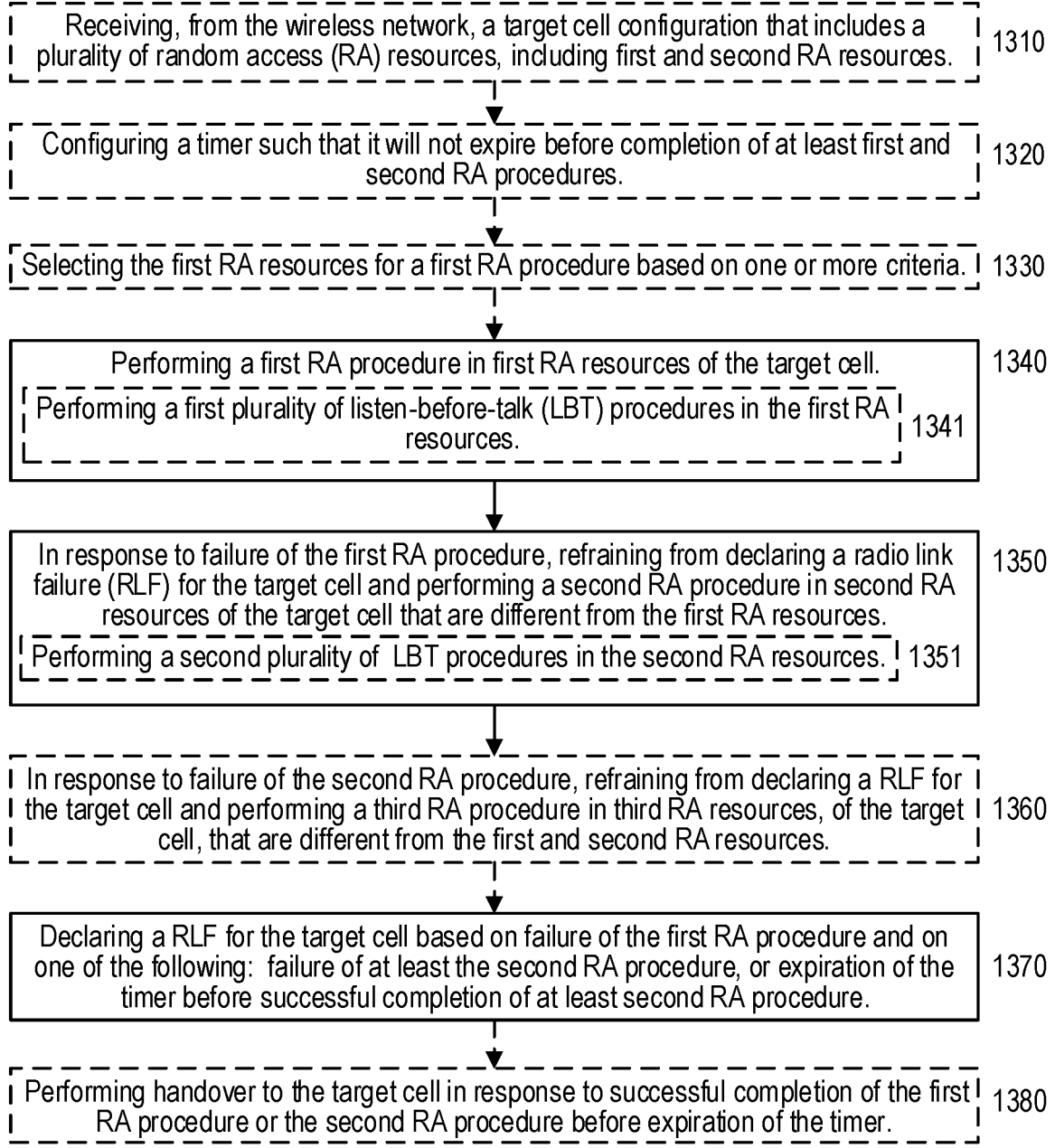
FIG. 13 shows a flow diagram of an exemplary method (e.g., procedure) performed by a user equipment (UE, e.g., wireless device, IoT device, etc.), according to various exemplary embodiments of the present disclosure.

In particular, FIG. 13 shows a flow diagram of an exemplary method (e.g., procedure) for performing handover to a target cell in a wireless network, according to various exemplary embodiments of the present disclosure. The exemplary method can be performed by a user equipment (UE, e.g., wireless device, IoT device, modem, etc. or component thereof) in communication with a network node (e.g., base station, eNB, gNB, ng-eNB, etc., or component thereof) in the wireless network (e.g., E-UTRAN, NG-RAN). For example, the exemplary method shown in FIG. 13 can be implemented in a UE configured as described herein with reference to other figures. In addition, the exemplary method shown in FIG. 13 can be used cooperatively with other exemplary methods described herein (e.g., FIG. 14) to provide various exemplary advantages described here. Although FIG. 13 shows specific blocks in a particular order, the operations of the exemplary method can be performed in a different order than shown and can be combined and/or divided into blocks having different functionality than shown. Optional blocks or operations are indicated by dashed lines.

The exemplary method shown in FIG. 13 can include the operations of blocks 1340, where the UE can perform a first random-access (RA) procedure in first RA resources of the target cell. The exemplary method can also include the operations of blocks 1350, where the UE can, in response to failure of the first RA procedure, refrain from declaring a radio link failure (RLF) for the target cell and perform a second RA procedure in second RA resources of the target cell that are different from the first RA resources. The exemplary method can also include the operations of blocks 1370, where the UE can declare a RLF for the target cell based on failure of the first RA procedure and on one of the following: failure of at least the second RA procedure, or expiration of the timer before successful completion of at least second RA procedure. In some embodiments, the exemplary method can also include the operations of blocks

1380, where the UE can perform handover to the target cell in response to successful completion of the first RA procedure or the second RA procedure before expiration of the timer.

In some embodiments, performing the first RA procedure in block 1340 can include the operations of sub-block 1341, where the UE can perform a first plurality of listen-before-talk (LBT) procedures in the first RA resources. In such embodiments, the failure of the first RA procedure can be based on a number of failures among the first plurality of LBT procedures being equal to or greater than a predetermined threshold (e.g., lbt-FailureInstanceMaxCount discussed above). Similarly, in some embodiments, performing the second RA procedure in block 1350 can include the operations of sub-block 1351, where the UE can perform a second plurality of LBT procedures in the second RA resources. In such embodiments, the failure of the second RA procedure can be based on a number of failures among the second plurality of LBT procedures being equal to or greater than the predetermined threshold.

In some embodiments, the exemplary method can also include the operations of blocks 1310 and 1330. In block 1310, the UE can receive, from the wireless network, a target cell configuration that includes a plurality of RA resources, including the first and second RA resources. In block 1330, the UE can select the first RA resources for the first RA procedure based on one or more of the following, which were discussed in more detail above:
  a predefined rule;
  a sequence indicated in the configuration for the target cell;
  types of RA procedures associated with the respective RA resources;
  characteristics of sub-bands or bandwidth parts (BWPs) in which the respective RA resources are located;
  respective availability indications, by the wireless network, for sub-bands or BWPs in which the respective RA resources are located;
  a value used to initialize the timer and one or more thresholds associated with the value;
  an amount of time remaining on the timer and one or more thresholds associated with the amount of time;
  measurements by the UE on reference signals associated with the respective RA resources; and
  interference measurements by the wireless network on the respective RA resources.

In some embodiments, the UE can be configured with a first bandwidth part (BWP) and a second BWP, with the first RA resources being in the first BWP and the second RA resources being in the second BWP. In some of these embodiments, each of the first BWP and the second BWP cam include two or more of the following:
  resources for two-step contention-based RA procedures;
  resources for two-step contention-free RA procedures;
  resources for four-step contention-based RA procedures; and
  resources for four-step contention-free RA procedures.

In other embodiments, the first RA resources are first time resources associated with the first BWP and the second RA resources are second time resources associated with the first BWP.

In some embodiments, the exemplary method can also include the operations of block 1360, where the UE can, in response to failure of the second RA procedure, refrain from declaring a RLF for the target cell and perform a third RA procedure in third RA resources, of the target cell, that are different from the first and second RA resources. In such embodiments, declaring the RLF for the target cell (e.g., in block 1370) can be based on failure of the first, second, and third RA procedures (in blocks 1340-1360, respectively). In such embodiments, the third RA resources can be in the second BWP or a third BWP that is different from the first and second BWPs.

In some embodiments, the UE can be configured with a normal uplink (UL) carrier and a supplementary UL carrier. In such embodiments, the first and second RA resources are associated with different ones of the normal and supplementary UL carriers, and the first RA resources can be selected for the first RA procedure based on UE measurements of respective reference signals associated with the normal UL carrier and the supplementary UL carrier.

In some embodiments, the exemplary method can also include the operations of block 1320, where the UE can, before performing the first RA procedure, configure the timer such that it will not expire before completion of at least the first and second RA procedures. In this manner, the timer's influence on declaring RLF can be mitigated, reduced, and/or eliminated, as discussed in more detail above.

In some embodiments, the first and second RA procedures (e.g., blocks 1340-1350) can be performed in unlicensed frequency spectrum. In such embodiments, the wireless network can be one of the following: an NG-RAN configured to support NR-U operation (e.g., above 52.6 GHz, as discussed above); or an E-UTRAN configured to support LTE licensed assisted access (LAA) operation (e.g., around 5 GHz).

Figure 14:
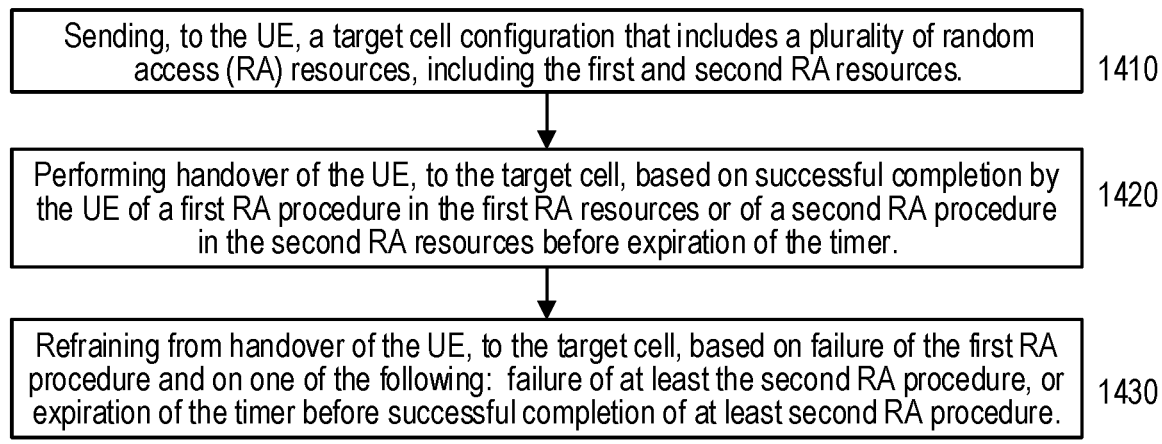
FIG. 14 shows a flow diagram of an exemplary method (e.g., procedure) performed by a network node (e.g., base station, eNB, gNB, ng-eNB, etc., or component thereof), according to various exemplary embodiments of the present disclosure.

In addition, FIG. 14 shows a flow diagram of an exemplary method (e.g., procedure) for configuring handover of a user equipment (UE) to a target cell in the wireless network, according to various exemplary embodiments of the present disclosure. The exemplary method can be performed by the wireless network (e.g., E-UTRAN, NG-RAN), such as by one or more network nodes (e.g., base station, eNB, gNB, ng-eNB, etc., or component thereof) in the wireless network. For example, the exemplary method shown in FIG. 14 can be implemented in network node(s) configured as described herein with reference to other figures. In addition, the exemplary method shown in FIG. 14 can be used cooperatively with other exemplary methods described herein (e.g., FIG. 13) to provide various exemplary advantages described here. Although FIG. 14 shows blocks in a particular order, the operations of the exemplary method can be performed in a different order than shown and can be combined and/or divided into blocks having different functionality than shown. Optional blocks or operations are indicated by dashed lines.

The exemplary method shown in FIG. 14 can include the operations of block 1410, where the wireless network can send, to the UE, a target cell configuration that includes a plurality of random access (RA) resources, including first and second RA resources. The exemplary method can also include the operations of block 1420, where the wireless network can perform handover of the UE, to the target cell, based on successful completion by the UE of a first RA procedure in the first RA resources or of a second RA procedure in the second RA resources, before expiration of the timer. The exemplary method can also include the operations of block 1430, where the wireless network can refrain from handover of the UE, to the target cell, based on failure of the first RA procedure and on one of the following: failure of at least the second RA procedure, or expiration of the timer before successful completion of at least second RA procedure.

In some embodiments, the first RA procedure can include a first plurality of listen-before-talk (LBT) procedures in the first RA resources. In such embodiments, the failure of the first RA procedure can be based on a number of failures among the first plurality of LBT procedures being equal to or greater than a predetermined threshold (e.g., lbt-Failure-InstanceMaxCount discussed above). Similarly, in some embodiments, the second RA procedure can include a second plurality of LBT procedures in the second RA resources. In such embodiments, the failure of the second RA procedure can be based on a number of failures among the second plurality of LBT procedures being equal to or greater than the predetermined threshold.

In some embodiments, the UE can be configured with a first bandwidth part (BWP) and a second BWP, with the first RA resources being in the first BWP and the second RA resources being in the second BWP. In some of these embodiments, each of the first BWP and the second BWP cam include two or more of the following:

resources for two-step contention-based RA procedures;
resources for two-step contention-free RA procedures;
resources for four-step contention-based RA procedures; and
resources for four-step contention-free RA procedures.

In other embodiments, the first RA resources are first time resources associated with the first BWP and the second RA resources are second time resources associated with the first BWP.

In some embodiments, the plurality of RA resources can include third RA resources, of the target cell, that are different from the first and second RA resources. For example, the third RA resources can be in the second BWP or in a third BWP that is different from the first and second BWPs. In some embodiments, the UE can be configured with a normal uplink (UL) carrier and a supplementary UL carrier. In such embodiments, the first and second RA resources are associated with different ones of the normal and supplementary UL carriers.

In some embodiments, the wireless network can be one of the following: an NG-RAN configured to support NR-U operation (e.g., above 52.6 GHz, as discussed above); or an E-UTRAN configured to support LTE licensed assisted access (LAA) operation (e.g., around 5 GHz).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 15:
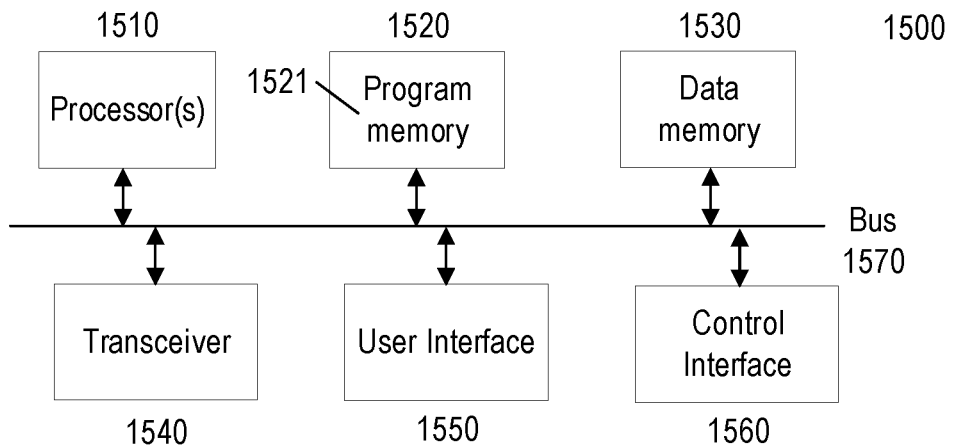
FIG. 15 is a block diagram of an exemplary wireless device or UE according to various exemplary embodiments of the present disclosure.

FIG. 15 shows a block diagram of an exemplary wireless device or user equipment (UE) 1500 (hereinafter referred to as "UE 1500") according to various embodiments of the present disclosure, including those described above with reference to other figures. For example, UE 1500 can be configured by execution of instructions, stored on a computer-readable medium, to perform operations corresponding to one or more of the exemplary methods described herein.

UE 1500 can include a processor 1510 (also referred to as "processing circuitry") that can be operably connected to a program memory 1520 and/or a data memory 1530 via a bus 1570 that can comprise parallel address and data buses, serial ports, or other methods and/or structures known to those of ordinary skill in the art. Program memory 1520 can store software code, programs, and/or instructions (collectively shown as computer program product 1521 in FIG. 15) that, when executed by processor 1510, can configure and/or facilitate UE 1500 to perform various operations, including operations corresponding to various exemplary methods described herein. As part of or in addition to such operations, execution of such instructions can configure and/or facilitate UE 1500 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1540, user interface 1550, and/or control interface 1560.

As another example, processor 1510 can execute program code stored in program memory 1520 that corresponds to MAC, RLC, PDCP, and RRC layer protocols standardized by 3GPP (e.g., for NR and/or LTE). As a further example, processor 1510 can execute program code stored in program memory 1520 that, together with radio transceiver 1540, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1510 can execute program code stored in program memory 1520 that, together with radio transceiver 1540, implements device-to-device (D2D) communications with other compatible devices and/or UEs.

Program memory 1520 can also include software code executed by processor 1510 to control the functions of UE 1500, including configuring and controlling various components such as radio transceiver 1540, user interface 1550, and/or control interface 1560. Program memory 1520 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1520 can comprise an external storage arrangement (not shown) remote from UE 1500, from which the instructions can be downloaded into program memory 1520 located within or removably coupled to UE 1500, so as to enable execution of such instructions.

Data memory 1530 can include memory area for processor 1510 to store variables used in protocols, configuration, control, and other functions of UE 1500, including operations corresponding to, or comprising, any of the exemplary methods described herein. Moreover, program memory 1520 and/or data memory 1530 can include non-volatile memory (e.g., flash memory), volatile memory (e.g., static or dynamic RAM), or a combination thereof. Furthermore, data memory 1530 can comprise a memory slot by which removable memory cards in one or more formats (e.g., SD Card, Memory Stick, Compact Flash, etc.) can be inserted and removed.

Persons of ordinary skill will recognize that processor 1510 can include multiple individual processors (including, e.g., multi-core processors), each of which implements a portion of the functionality described above. In such cases, multiple individual processors can be commonly connected to program memory 1520 and data memory 1530 or individually connected to multiple individual program memories and or data memories. More generally, persons of ordinary skill in the art will recognize that various protocols and other functions of UE 1500 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1540 can include radio-frequency transmitter and/or receiver functionality that facilitates the UE 1500 to communicate with other equipment supporting like wireless communication standards and/or protocols. In some exemplary embodiments, the radio transceiver 1540 includes one or more transmitters and one or more receivers that enable UE 1500 to communicate according to various protocols and/or methods proposed for standardization by 3GPP and/or other standards bodies. For example, such functionality can operate cooperatively with processor 1510 to implement a PHY layer based on OFDM, OFDMA, and/or SC-FDMA technologies, such as described herein with respect to other figures.

In some exemplary embodiments, radio transceiver 1540 includes one or more transmitters and one or more receivers that can facilitate the UE 1500 to communicate with various LTE, LTE-Advanced (LTE-A), and/or NR networks according to standards promulgated by 3GPP. In some exemplary embodiments of the present disclosure, the radio transceiver 1540 includes circuitry, firmware, etc. necessary for the UE 1500 to communicate with various NR, NR-U, LTE, LTE-A, LTE-LAA, UMTS, and/or GSM/EDGE networks, also according to 3GPP standards. In some embodiments, radio transceiver 1540 can include circuitry supporting D2D communications between UE 1500 and other compatible devices.

In some embodiments, radio transceiver 1540 includes circuitry, firmware, etc. necessary for the UE 1500 to communicate with various CDMA2000 networks, according to 3GPP2 standards. In some embodiments, the radio transceiver 1540 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1540 can include a transceiver that is capable of wired communication, such as by using IEEE 802.3 Ethernet technology. The functionality particular to each of these embodiments can be coupled with and/or controlled by other circuitry in the UE 1500, such as the processor 1510 executing program code stored in program memory 1520 in conjunction with, and/or supported by, data memory 1530.

User interface 1550 can take various forms depending on the particular embodiment of UE 1500, or can be absent from UE 1500 entirely. In some embodiments, user interface 1550 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1500 can comprise a tablet computing device including a larger touchscreen display. In such embodiments, one or more of the mechanical features of the user interface 1550 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1500 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1500 having a touch screen display are capable of receiving user inputs, such as inputs related to exemplary methods described herein or otherwise known to persons of ordinary skill.

In some embodiments, UE 1500 can include an orientation sensor, which can be used in various ways by features and functions of UE 1500. For example, the UE 1500 can use outputs of the orientation sensor to determine when a user has changed the physical orientation of the UE 1500's touch screen display. An indication signal from the orientation sensor can be available to any application program executing on the UE 1500, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1560 of the UE 1500 can take various forms depending on the particular exemplary embodiment of UE 1500 and of the particular interface requirements of other devices that the UE 1500 is intended to communicate with and/or control. For example, the control interface 1560 can comprise an RS-232 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1560 can comprise an IEEE 802.3 Ethernet interface such as described above. In some exemplary embodiments of the present disclosure, the control interface 1560 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1500 can comprise more functionality than is shown in FIG. 15 including, for example, a video and/or still-image camera, microphone, media player and/or recorder, etc. Moreover, radio transceiver 1540 can include circuitry necessary to communicate using additional radio-frequency communication standards including Bluetooth, GPS, and/or others. Moreover, the processor 1510 can execute software code stored in the program memory 1520 to control such additional functionality. For example, directional velocity and/or position estimates output from a GPS receiver can be available to any application program executing on the UE 1500, including any program code corresponding to and/or embodying any exemplary embodiments (e.g., of methods) described herein.

Figure 16:
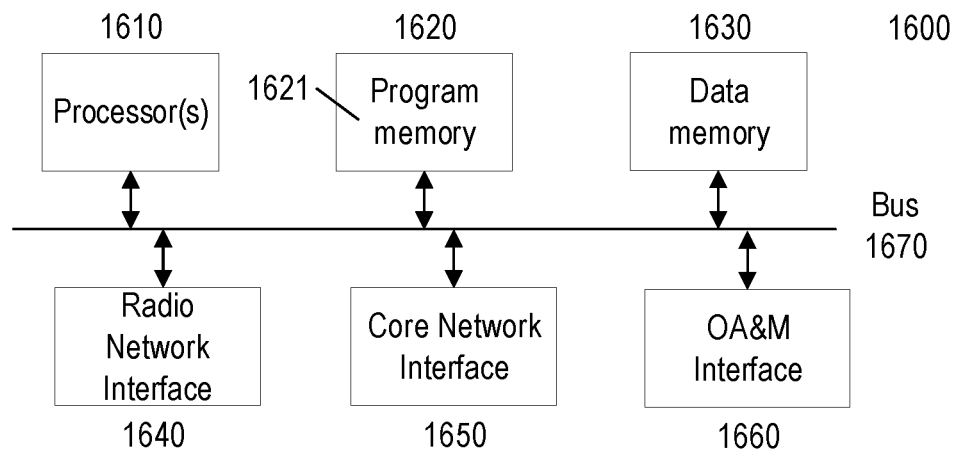
FIG. 16 is a block diagram of an exemplary network node according to various exemplary embodiments of the present disclosure.

FIG. 16 shows a block diagram of an exemplary network node 1600 according to various embodiments of the present disclosure, including those described above with reference to other figures. For example, exemplary network node 1600 can be configured by execution of instructions, stored on a computer-readable medium, to perform operations corresponding to one or more of the exemplary methods described herein. In some exemplary embodiments, network node 1600 can comprise a base station, eNB, gNB, or one or more components thereof. For example, network node 1600 can be configured as a central unit (CU) and one or more distributed units (DUs) according to NR gNB architectures specified by 3GPP. More generally, the functionally of network node 1600 can be distributed across various physical devices and/or functional units, modules, etc.

Network node 1600 can include processor 1610 (also referred to as "processing circuitry") that is operably connected to program memory 1620 and data memory 1630 via bus 1670, which can include parallel address and data buses, serial ports, or other methods and/or structures known to those of ordinary skill in the art.

Program memory 1620 can store software code, programs, and/or instructions (collectively shown as computer program product 1621 in FIG. 16) that, when executed by processor 1610, can configure and/or facilitate network node 1600 to perform various operations, including operations corresponding to various exemplary methods described herein. As part of and/or in addition to such operations, program memory 1620 can also include software code executed by processor 1610 that can configure and/or facilitate network node 1600 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1640 and/or core network interface 1650. By way of example, core network interface 1650 can comprise the S1 or NG interface and radio network interface 1640 can comprise the Uu interface, as standardized by 3GPP. Program memory 1620 can also comprise software code executed by processor 1610 to control the functions of network node 1600, including configuring and controlling various components such as radio network interface 1640 and core network interface 1650.

Data memory 1630 can comprise memory area for processor 1610 to store variables used in protocols, configuration, control, and other functions of network node 1600. As such, program memory 1620 and data memory 1630 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1610 can include multiple individual processors (not shown), each of which implements a portion of the functionality described above. In such case, multiple individual processors may be commonly connected to program memory 1620 and data memory 1630 or individually connected to multiple individual program memories and/or data memories. More generally, persons of ordinary skill will recognize that various protocols and other functions of network node 1600 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1640 can comprise transmitters, receivers, signal processors, ASICs, antennas, beamforming units, and other circuitry that enables network node 1600 to communicate with other equipment such as, in some embodiments, a plurality of compatible user equipment (UE). In some embodiments, interface 1640 can also enable network node 1600 to communicate with compatible satellites of a satellite communication network. In some exemplary embodiments, radio network interface 1640 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1640. According to further exemplary embodiments of the present disclosure, the radio network interface 1640 can comprise a PHY layer based on OFDM, OFDMA, and/or SC-FDMA technologies. In some embodiments, the functionality of such a PHY layer can be provided cooperatively by radio network interface 1640 and processor 1610 (including program code in memory 1620).

Core network interface 1650 can comprise transmitters, receivers, and other circuitry that enables network node 1600 to communicate with other equipment in a core network such as, in some embodiments, circuit-switched (CS) and/or packet-switched Core (PS) networks. In some embodiments, core network interface 1650 can comprise the S1 interface standardized by 3GPP. In some embodiments, core network interface 1650 can comprise the NG interface standardized by 3GPP. In some exemplary embodiments, core network interface 1650 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1650 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1600 can include hardware and/or software that configures and/or facilitates network node 1600 to communicate with other network nodes in a RAN, such as with other eNBs, gNBs, ng-eNBs, en-gNBs, IAB nodes, etc. Such hardware and/or software can be part of radio network interface 1640 and/or core network interface 1650, or it can be a separate functional unit (not shown). For example, such hardware and/or software can configure and/or facilitate network node 1600 to communicate with other RAN nodes via the X2 or Xn interfaces, as standardized by 3GPP.

OA&M interface 1660 can comprise transmitters, receivers, and other circuitry that enables network node 1600 to communicate with external networks, computers, databases, and the like for purposes of operations, administration, and maintenance of network node 1600 or other network equipment operably connected thereto. Lower layers of OA&M interface 1660 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1640, core network interface 1650, and OA&M interface 1660 may be multiplexed together on a single physical interface, such as the examples listed above.

Figure 17:
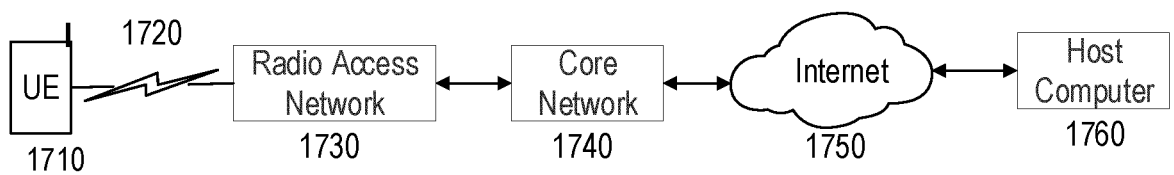
FIG. 17 is a block diagram of an exemplary network configured to provide over-the-top (OTT) data services between a host computer and a UE, according to various exemplary embodiments of the present disclosure.

FIG. 17 is a block diagram of an exemplary communication network configured to provide over-the-top (OTT)

data services between a host computer and a user equipment (UE), according to one or more exemplary embodiments of the present disclosure. UE 1710 can communicate with radio access network (RAN) 1730 over radio interface 1720, which can be based on protocols described above including, e.g., LTE, LTE-A, and 5G/NR. For example, UE 1710 can be configured and/or arranged as shown in other figures discussed above.

RAN 1730 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1730 can cooperatively operate using licensed and unlicensed spectrum. In some embodiments, RAN 1730 can include, or be capable of communication with, one or more satellites comprising a satellite access network.

RAN 1730 can further communicate with core network 1740 according to various protocols and interfaces described above. For example, one or more apparatus (e.g., base stations, eNBs, gNBs, etc.) comprising RAN 1730 can communicate to core network 1740 via core network interface 1750 described above. In some exemplary embodiments, RAN 1730 and core network 1740 can be configured and/or arranged as shown in other figures discussed above. For example, eNBs comprising an E-UTRAN 1730 can communicate with an EPC core network 1740 via an S1 interface. As another example, gNBs and ng-eNBs comprising an NG-RAN 1730 can communicate with a 5GC core network 1730 via an NG interface.

Core network 1740 can further communicate with an external packet data network, illustrated in FIG. 17 as Internet 1750, according to various protocols and interfaces known to persons of ordinary skill in the art. Many other devices and/or networks can also connect to and communicate via Internet 1750, such as exemplary host computer 1760. In some exemplary embodiments, host computer 1760 can communicate with UE 1710 using Internet 1750, core network 1740, and RAN 1730 as intermediaries. Host computer 1760 can be a server (e.g., an application server) under ownership and/or control of a service provider. Host computer 1760 can be operated by the OTT service provider or by another entity on the service provider's behalf.

For example, host computer 1760 can provide an over-the-top (OTT) packet data service to UE 1710 using facilities of core network 1740 and RAN 1730, which can be unaware of the routing of an outgoing/incoming communication to/from host computer 1760. Similarly, host computer 1760 can be unaware of routing of a transmission from the host computer to the UE, e.g., the routing of the transmission through RAN 1730. Various OTT services can be provided using the exemplary configuration shown in FIG. 17 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 17 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide enhanced techniques for selecting resources for random access during handovers to target cells in unlicensed (e.g., NR-U) operation. Such embodiments can cause the UE to avoid being stalled due to occurrence of consistent UL LBT failures, and can provide a way for a UE to quickly recover from consistent LBT failures during handover. Furthermore, such embodiments can mitigate and/or reduce interruptions to UE services due to LBT failures, thereby facilitating use of services (e.g., URLLC, etc.) on unlicensed spectrum. When used in NR UEs (e.g., UE 1710) and gNBs (e.g., gNBs comprising RAN 1730), exemplary embodiments described herein can provide various improvements, benefits, and/or advantages that facilitate and/or improve the use of data services (e.g., URLLC) in unlicensed spectrum. As a consequence, this improves the performance of these services as experienced by OTT service providers and end-users, including more consistent data throughout and lower latency without excessive UE power consumption or other reductions in user experience.

The invention claimed is:

1. A method in a user equipment (UE) for performing handover to a target cell in a wireless network, the method comprising:
    performing a first random-access (RA) procedure in first RA resources of the target cell;
    in response to failure of the first RA procedure, refraining from declaring a radio link failure (RLF) for the target cell and performing a second RA procedure in second RA resources of the target cell that are different from the first RA resources; and
    declaring a RLF for the target cell based on failure of the first RA procedure and on expiration of a timer before successful completion of the second RA procedure.

2. The method of claim 1, wherein:
    performing the first RA procedure comprises performing a first plurality of listen-before-talk (LBT) procedures in the first RA resources; and
    the failure of the first RA procedure is based on a number of failures among the first plurality of LBT procedures being equal to or greater than a predetermined threshold.

3. The method of claim 2, wherein
    performing the second RA procedure comprises performing a second plurality of LBT procedures in the second RA resources.

4. The method of claim 1, further comprising:
    receiving, from the wireless network, a target cell configuration that includes a plurality of RA resources, including the first and second RA resources; and
    selecting the first RA resources for the first RA procedure based on one or more of the following:
        a predefined rule;
        a sequence indicated in the configuration for the target cell;
        types of RA procedures associated with the respective RA resources;
        characteristics of sub-bands or bandwidth parts (BWPs) in which the respective RA resources are located;
        respective availability indications, by the wireless network, for sub-bands or BWPs in which the respective RA resources are located;

a value used to initialize the timer and one or more thresholds associated with the value;

an amount of time remaining on the timer and one or more thresholds associated with the amount of time;

measurements by the UE on reference signals associated with the respective RA resources; and interference measurements by the wireless network on the respective RA resources.

5. The method of claim 1, wherein:
the UE is configured with a first bandwidth part (BWP) and a second BWP;
the first RA resources are in the first BWP; and
the second RA resources are in the second BWP.

6. The method of claim 5, wherein each of the first BWP and the second BWP includes two or more of the following:
resources for two-step contention-based RA procedures;
resources for two-step contention-free RA procedures;
resources for four-step contention-based RA procedures; and
resources for four-step contention-free RA procedures.

7. The method of claim 1, wherein:
the UE is configured with a first bandwidth part (BWP) and a second BWP;
the first RA resources are first time resources associated with the first BWP; and
the second RA resources are second time resources associated with the first BWP.

8. The method of claim 1, wherein:
the UE is configured with a normal uplink (UL) carrier and a supplementary UL carrier;
the first RA resources are associated with one of the normal and supplementary UL carriers;
the second RA resources are associated with the other of the normal and supplementary UL carriers; and
the first RA resources are selected for the first RA procedure based on UE measurements of respective reference signals associated with the normal UL carrier or with the supplementary UL carrier.

9. The method of claim 1, further comprising, before performing the first RA procedure, configuring the timer such that it will not expire before completion of at least the first and second RA procedures.

10. The method of claim 1, further comprising performing handover to the target cell in response to successful completion of the first RA procedure or the second RA procedure before expiration of the timer.

11. The method of claim 1, wherein:
the first and second RA procedures are performed in unlicensed frequency spectrum; and
the wireless network is one of the following:
an NG-RAN configured to support NR unlicensed (NR-U) operation; or
an E-UTRAN configured to support LTE licensed assisted access (LAA) operation.

12. A user equipment (UE) configured for handover to a target cell in a wireless network, the UE comprising:
radio transceiver circuitry configured to communicate with a network node in the wireless network; and
processing circuitry operatively coupled to the radio transceiver circuitry, whereby the processing circuitry and the radio transceiver circuitry are configured to perform operations corresponding to the method of claim 1.

* * * * *